United States Patent
Gobara et al.

(10) Patent No.: US 8,761,232 B2
(45) Date of Patent: Jun. 24, 2014

(54) BIT CHANGE DETERMINATION METHOD AND BIT CHANGE DETERMINATION DEVICE

(75) Inventors: Naoki Gobara, Shiojiri (JP); Mikio Nagahara, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 363 days.

(21) Appl. No.: 13/225,307

(22) Filed: Sep. 2, 2011

(65) Prior Publication Data

US 2012/0057662 A1    Mar. 8, 2012

(30) Foreign Application Priority Data

Sep. 6, 2010 (JP) .................................. 2010-198610
Jul. 22, 2011 (JP) .................................. 2011-160713

(51) Int. Cl.
*H04B 1/709* (2011.01)

(52) U.S. Cl.
USPC ....................................................... 375/147

(58) Field of Classification Search
USPC ........................................ 375/142, 147, 150
See application file for complete search history.

(56) References Cited

U.S. PATENT DOCUMENTS

| 5,768,319 | A | 6/1998 | Druboraw, III |
| 2008/0112469 | A1* | 5/2008 | Goldberg et al. ............. 375/150 |
| 2010/0328145 | A1 | 12/2010 | Wang et al. |

* cited by examiner

*Primary Examiner* — Kevin Kim
(74) *Attorney, Agent, or Firm* — Kilpatrick Townsend & Stockton LLP

(57) ABSTRACT

A bit change determination method includes performing a correlation operation of a signal received from a satellite and a replica code, segmenting the signal using a bit transition timing of navigation message data and performing a first calculation to calculate the result of the correlation operation for a first period having N (N≥1) continuous unit periods with a bit period of navigation message data as a unit period, performing a second calculation to calculate the result of the correlation operation for a second period having M (M>1) continuous unit periods adjacent to the first period, and determining whether a bit value changes or not at a boundary between the first period and the second period using the first and second calculation results.

7 Claims, 13 Drawing Sheets

FIG. 5

BIT CHANGE DETERMINATION DATA — 2741
SATELLITE NUMBER: SV1 — 2743
FIRST PRE-INSPECTION TIME: 40 MILLISECONDS (N=2) — 2747
SECOND PRE-INSPECTION TIME: 40 MILLISECONDS (M=2) — 2745

| | MEASUREMENT TIME | t1 | t2 | t3 | t4 DETERMINATION TIME (FIRST) | t5 DETERMINATION TIME (SECOND) | t6 DETERMINATION TIME (THIRD) | ... |
|---|---|---|---|---|---|---|---|---|
| FIRST PRE-INSPECTION PERIOD | PSumI | PSI(1) | PSI(2) | PSI(3) | PSI(4) | PSI(5) | PSI(6) | ... |
| | PSumQ | PSQ(1) | PSQ(2) | PSQ(3) | PSQ(4) | PSQ(5) | PSQ(6) | ... |
| | Power⁺ | — | P⁺(1,2) | P⁺(2,3) | P⁺(3,4) | P⁺(4,5) | P⁺(5,6) | ... |
| | Power⁻ | — | P⁻(1,2) | P⁻(2,3) | P⁻(3,4) | P⁻(4,5) | P⁻(5,6) | ... |
| SECOND PRE-INSPECTION PERIOD | Power⁺ | — | — | — | P⁺(3,4) | P⁺(4,5) | P⁺(5,6) | ... |
| | Power⁻ | — | — | — | P⁻(3,4) | P⁻(4,5) | P⁻(5,6) | ... |
| FIRST INSPECTION PERIOD | SumI | — | SumI(1,2) | SumI(2,3) | SumI(3,4) | SumI(4,5) | SumI(5,6) | ... |
| | SumQ | — | SumQ(1,2) | SumQ(2,3) | SumQ(3,4) | SumQ(4,5) | SumQ(5,6) | ... |
| SECOND INSPECTION PERIOD | SumI | — | — | — | SumI(3,4) | SumI(4,5) | SumI(5,6) | ... |
| | SumQ | — | — | — | SumQ(3,4) | SumQ(4,5) | SumQ(5,6) | ... |
| | Dot | — | — | — | Dot(2|3) | Dot(3|4) | Dot(4|5) | ... |
| | BIT CHANGE DETERMINATION RESULT | — | — | — | PRESENT | PRESENT | ABSENT | ... |

2749

| SIGNAL INTENSITY | FIRST PRE-INSPECTION TIME (N) | SECOND PRE-INSPECTION TIME (M) |
|---|---|---|
| ~S1 | 40ms (N=2) | 60ms (M=3) |
| S1~S2 | 80ms (N=4) | 100ms (M=5) |
| S2~S3 | 120ms (N=6) | 140ms (M=7) |
| S3~S4 | 160ms (N=8) | 180ms (M=9) |
| ⋮ | ⋮ | ⋮ |

STRONG ↑ / WEAK ↓

FIG.12

| RECEPTION ENVIRONMENT | FIRST PRE-INSPECTION TIME (N) | SECOND PRE-INSPECTION TIME (M) |
|---|---|---|
| STRONGEST ELECTRIC FIELD | 40ms (N=2) | 40ms (M=2) |
| STRONG ELECTRIC FIELD | 80ms (N=4) | 80ms (M=4) |
| MEDIUM ELECTRIC FIELD | 120ms (N=6) | 120ms (M=6) |
| WEAK ELECTRIC FIELD | 160ms (N=8) | 160ms (M=8) |
| ⋮ | ⋮ | ⋮ |

GOOD ↑ / BAD ↓

FIG.13

BIT CHANGE DETERMINATION METHOD AND BIT CHANGE DETERMINATION DEVICE

BACKGROUND

1. Technical Field

The present invention relates to a bit change determination method or the like which determines the presence/absence of a change in a bit value of navigation message data.

2. Related Art

As a positioning system using a positioning signal, GPS (Global Positioning System) is widely known and used in a receiving device embedded in a mobile phone, a car navigation system, or the like. In the GPS, position calculation is performed to obtain the position coordinate and the timepiece error of the receiving device on the basis of information regarding the positions of a plurality of GPS satellites, the pseudo distance between each GPS satellite and the receiving device, or the like.

GPS satellite signals which are sent from the GPS satellites are modulated with spread codes, called CA (Coarse and Acquisition) codes, which differ between the GPS satellites. The CA codes are pseudo random noise codes having a repetition cycle of 1 ms with a code length 1023 chips as 1 PN frame. In order to acquire a GPS satellite signal from a feeble reception signal, the receiving device performs a correlation operation of the reception signal and a replica CA code which is a pseudo CA code generated inside the device, and acquires a GPS satellite signal on the basis of the obtained correlation value. In this case, in order to facilitate the detection of a peak correlation value, a method is used in which the correlation values are accumulated for a predetermined correlation accumulation time.

However, in the GPS satellite signals, the CA codes which are the spread codes are subjected to BPSK (Binary Phase Shift Keying) modulation in accordance with the bit values of navigation message data. For this reason, if the correlation operation of the reception signal when a GPS satellite signal is received and the replica CA code is performed, correlation values with exactly reversed signs are obtained before and after the bit values of navigation message data are changed (transited). Thus, when accumulating the correlation values over 20 milliseconds which are the data bit length of navigation message data, the correlation values having different signs may be accumulated.

In order to solve the above-described problem, for example, U.S. Pat. No. 5,768,319 describes a technique which calculates an inner product using a correlation value (hereinafter, referred to as "I-phase correlation value") obtained by a correlation operation on an I-phase reception signal and a correlation value (hereinafter, referred to as "Q-phase correlation value") obtained by a correlation operation on a Q-phase reception signal, and determines the presence/absence of changes in the bit values of navigation message data using the inner product value.

According to the technique of U.S. Pat. No. 5,768,319, the I-phase correlation values for 20 milliseconds are initially totalized to calculate an I-phase accumulated correlation value, and similarly, the Q-phase correlation values for 20 milliseconds are totalized to calculate a Q-phase accumulated correlation value. The inner product value is calculated using the I-phase accumulated correlation values and the Q-phase accumulated correlation values of adjacent 20-milliseconds periods. The inner product value calculated for every 20 milliseconds is accumulated for a predetermined time (for example, for 30 seconds), and the presence/absence of changes in the bit values of navigation message data is determined using the accumulation result of the inner product values.

According to the technique of U.S. Pat. No. 5,768,319, for bit change determination, it is necessary to accumulate and store data of the inner product values for a predetermined time in a memory. For example, if the inner product values for 30 seconds are used, since it is necessary to accumulate and store data of 1500 inner product values in the memory, the memory should be large in capacity. At the time of the initial reception of the GPS satellite signals, since bit change determination may not be made unless at least 30 seconds have elapsed, it takes a lot of time for the initial acquisition of the GPS satellite signals.

SUMMARY

An advantage of some aspects of the invention is that it provides a novel technique for determining the presence/absence of changes in the bit values of navigation message data.

A first aspect of the invention is directed to a bit change determination method including: performing a correlation operation of a reception signal received from a satellite and a replica code, segmenting the reception signal using the bit transition timing of navigation message data and performing a first calculation to calculate the result of the correlation operation for a first period having N (N≥1) continuous unit periods with a bit period of navigation message data as a unit period, performing a second calculation to calculate the result of the correlation operation for a second period having M (M>1) continuous unit periods adjacent to the first period, and determining the presence/absence of changes in bit values at the boundary between the first period and the second period using the first and second calculation results.

As another aspect of the invention, the invention may be configured as a bit change determination device including: a correlation operation unit which performs a correlation operation of a reception signal received from a satellite and a replica code, a first calculation unit which segments the reception signal using the bit transition timing of navigation message data and performs a first calculation to calculate the result of the correlation operation for a first period having N (M>1) continuous unit periods with a bit period of navigation message data as a unit period, a second calculation unit which performs a second calculation to calculate the result of the correlation operation for a second period having M (M>1) continuous unit periods adjacent to the first period, and a determination unit which determines the presence/absence of changes in bit values at the boundary between the first period and the second period using the first and second calculation results.

With the first aspect and the like, the correlation operation of the reception signal received from the satellite and the replica code is performed. The results of the correlation operations are calculated in the first period having N (N≥1) continuous unit periods and the second period having M (M>1) continuous unit periods adjacent to the first period. The presence/absence of changes in the bit values at the boundary between the first period and the second period is determined using the calculation results.

Unlike the related art, the presence/absence of changes in the bit values of navigation message data is determined using the calculation result of the correlation operation result for the first period having N continuous unit periods and the calculation result of the correlation operation result for the second period having M continuous unit periods, instead of using the calculation result of the result of the correlation operation for every 20 milliseconds. Therefore, it is possible to appropriately determine the presence/absence of changes in the bit values of navigation message data compared to the related art method. With the above-described aspects, unlike the related art, it is not necessary to store an enormous amount of data in the memory, and the acquisition of the satellite signals can be completed in a short time even at the time of initial reception.

As a second aspect of the invention, the bit change determination method of the first aspect may be configured to further include performing a first preliminary determination to determine the presence/absence of changes in the bit values of navigation message data in the first period using the result of the correlation operation, and performing a second preliminary determination to determine the presence/absence of changes in the bit values in the second period using the result of the correlation operation. The determining of the presence/absence of changes in the bit values at the boundary may include determining using the result of the first preliminary determination and the result of the second preliminary determination.

With this configuration, the first preliminary determination is performed to determine the presence/absence of changes in the bit values of navigation message data in the first period using the result of the correlation operation. Meanwhile, the second preliminary determination is performed to determine the presence/absence of changes in the bit values of navigation message data in the second period using the result of the correlation operation. The presence/absence of changes in the bit values at the boundary between the first period and the second period is determined using the result of the first preliminary determination and the result of the second preliminary determination.

Since the first and second periods may have a plurality of continuous unit periods, there maybe a plurality of bit transition timings. Thus, the presence/absence of changes in the bit values is preliminarily determined at these bit transition timings. With the preliminary determination, if the presence/absence of changes in the bit values of navigation message data is determined, it becomes possible to appropriately calculate the correlation operation result in accordance with the result of the preliminary determination. This leads to the improvement of accuracy for the determination of the presence/absence of bit changes at the boundary between the first period and the second period.

As a third aspect of the invention, the bit change determination method of the second aspect may be configured such that the performing of the first calculation includes performing a plurality of calculations having combined therein addition and subtraction using the results of N correlation operations in the first period. The performing of the first preliminary determination may include determining the presence/absence of changes in the bit values of navigation message data in the first period using a plurality of calculation results in the first calculation. The performing of the second calculation may include performing a plurality of calculations having combined therein addition and subtraction using the results of M correlation operations in the second period. The performing of the second preliminary determination may include determining the presence/absence of changes in the bit values of navigation message data in the second period using a plurality of calculation results in the second calculation.

With this configuration, a plurality of calculations having combined therein addition and subtraction are performed using the result of the correlation operation for each unit period of the first period. The presence/absence of changes in the bit values of navigation message data in the first period is preliminarily determined using a plurality of calculation results. Similarly, a plurality of calculations having combined therein addition and subtraction are performed using the result of the correlation operation for each unit period of the second period. The presence/absence of changes in the bit values of navigation message data in the second period is preliminarily determined using a plurality of calculation results.

In both the first and second periods, it is unclear whether or not the bit values of navigation message data in each period are changed. Thus, in both the first and second periods, a plurality of calculations having combined therein addition and subtraction are performed using the result of the correlation operation for each unit period. With the use of a plurality of calculation results, it is possible to appropriately preliminarily determine the presence/absence of changes in the bit values of navigation message data in each period.

As a fourth aspect of the invention, the bit change determination method of the third aspect may be configured such that the performing of the first preliminary determination includes calculating a plurality of methods using the results of the N correlation operations and calculating a plurality of power values, and determining the presence/absence of changes in the bit values of navigation message data in the first period on the basis of a calculation method in which the maximum power value is obtained. The performing of the second preliminary determination may include calculating a plurality of methods using the results of the M correlation operations and calculating a plurality of power values, and determining the presence/absence of changes in the bit values of navigation message data in the second period on the basis of a calculation method in which the maximum power value is obtained.

With this configuration, with regard to the first preliminary determination, a plurality of methods are calculated using the results of the N correlation operations, and a plurality of power values are calculated. The presence/absence of changes in the bit values of navigation message data in the first period is determined on the basis of a calculation method in which the maximum power value is obtained. The same is applied to the second preliminary determination.

When the bit values of navigation message data are changed, if the correlation operation results in the previous and subsequent unit periods are added directly, the correlation operation results cancel each other, such that the power value becomes small. However, if the correlation operation results in the previous and subsequent unit periods are subtracted, the signs can be identical and the correlation operation results can be totalized, thereby increasing the power value. Therefore, if a calculation method in which the maximum power value is obtained is specified, the presence/absence of changes in the bit values at each bit transition timing for each unit period becomes known.

As a fifth aspect of the invention, the bit change determination method of any of the first to fourth aspects may be configured such that the determining of the presence/absence of changes in the bit values at the boundary includes calculating an inner product of the first calculation result and the second calculation result to determine the presence/absence of changes in the bit values.

With this configuration, it is possible to determine the presence/absence of changes in the bit values at the boundary between the first period and the second period by an easy and simple method which calculates the inner product of the first calculation result and the second calculation result.

As a sixth aspect of the invention, the bit change determination method of any of the first to fifth aspect may be configured to further include changing at least one of N and M on the basis of the reception situation of the satellite signal.

With this configuration, at least one of N and M is changed on the basis of the reception situation of the satellite signal. The reception situation of the satellite signal may differ between the satellites. Therefore, with this configuration, it becomes possible to set the first period or the second period for determining the presence/absence of changes in the bit values for each satellite.

As a seventh aspect of the invention, the bit change determination method of the sixth aspect may be configured such that the changing includes changing at least one of N and M to a smaller value when the reception situation is satisfactory than when the reception situation is not satisfactory.

With this configuration, at least one of N and M is changed to a smaller value when the reception situation of the satellite signal is satisfactory than when the reception situation of the satellite signal is not satisfactory. If the reception situation of the satellite signal is satisfactory, the correlation operation of the reception signal of the satellite signal and the replica code is performed, thereby obtaining a reliable correlation operation result. Therefore, it is possible to appropriately determine the presence/absence of changes in the bit values at the boundary between the first period and the second period even when the first period or the second period is shorter, compared to a case where the reception situation of the satellite signal is not satisfactory.

BRIEF DESCRIPTION OF THE DRAWINGS

The invention will be described with reference to the accompanying drawings, wherein like numbers reference like elements.

FIG. 5 is a diagram showing an example of the data configuration of satellite-specific bit change determination data.

FIG. 12 is a diagram showing the table configuration of a first setting table.

FIG. 13 is a diagram showing the table configuration of a second setting table.

DESCRIPTION OF EXEMPLARY EMBODIMENTS

Figure 1:
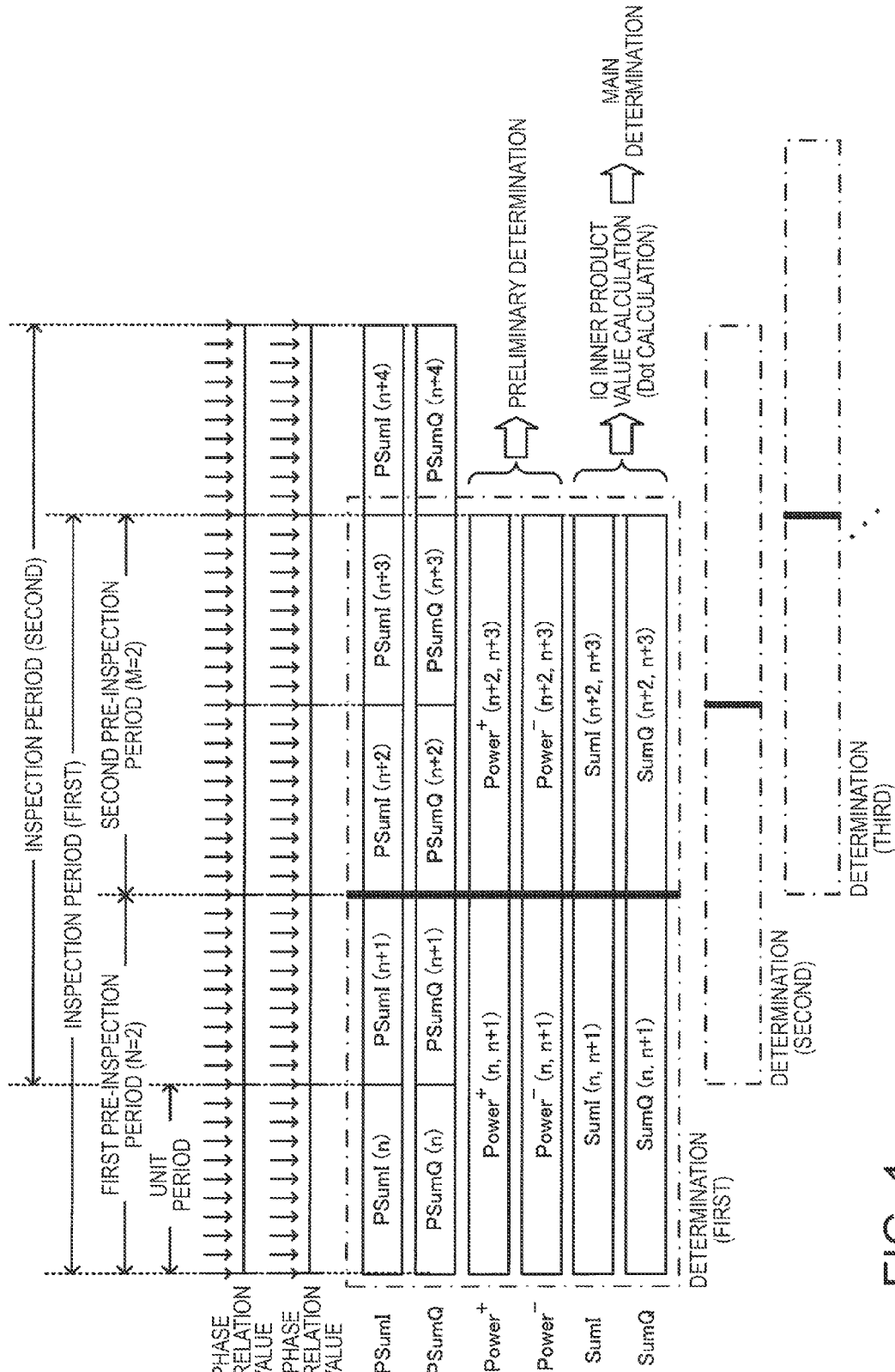
FIG. 1 is an explanatory view of the principle of bit change determination in an embodiment.

Hereinafter, an exemplary embodiment of the invention will be described. It should be noted that a form to which the invention can be applied is not limited to the embodiment described below.

1. Principle

First, the principle of bit change determination of navigation message data in this embodiment will be described. In this embodiment, description will be provided as to an example where a GPS (Global Positioning System) which is a kind of satellite positioning system is used, and the presence/absence of changes in the bit values of navigation message data carried on a reception signal of a GPS satellite signal transmitted from a GPS satellite is determined.

In a satellite positioning system using a GPS, a GPS satellite which is a kind of positioning satellite transmits navigation message data including satellite orbit data, such as almanac or ephemeris in a state of being carried on a GPS satellite signal which is a kind of positioning satellite signal. The GPS satellite signal is a communication signal of 1.57542 [GHz] modulated by a CDMA (Code Division Multiple Access) system, which is known as a spread spectrum system, with a CA (Coarse and Acquisition) code which is a kind of spread code. The CA code is a pseudo random noise code having a repetition cycle of 1 ms with a code length 1023 chips as 1 PN frame, and is a code specific to each GPS satellite.

Although a frequency (prescribed carrier frequency) when a GPS satellite transmits a GPS satellite signal is prescribed to 1.57542 [GHz], a frequency when the GPS receiving device receives the GPS satellite signal does not necessarily coincide with the prescribed carrier frequency due to the influence of Doppler caused by the movement of the GPS satellite and the GPS receiving device, or the like. For this reason, the GPS receiving device uses a method which performs a correlation operation of a reception signal and a pseudo replica CA code generated inside the device in each of a frequency direction and a phase direction to acquire a GPS satellite signal.

The correlation operation in the frequency direction is an operation (so-called frequency search) for specifying the frequency (hereinafter, referred to as "reception frequency") of a reception carrier signal which is a received carrier (carrier wave) signal. The correlation operation in the phase direction is an operation (so-called phase search) for specifying the phase (hereinafter, referred to as "code phase") of a reception CA code which is a CA code in a reception signal. Specifically, the GPS receiving device performs a correlation operation while changing the frequency of a carrier elimination signal for eliminating the carriers from the reception carrier signal and the phase of the replica CA code. The peak correlation value is detected to specify the reception frequency and the code phase.

However, in a weak electric field environment or the like represented by an indoor environment, the level of the correlation value is lowered as a whole, making it difficult to detect the peak. In this reception environment, a method is used in which the correlation values obtained by the correlation operation are accumulated over a predetermined correlation accumulation time, and the peak is detected from the obtained accumulated correlation value.

On the other hand, in the GPS satellite signal, a CA code which is a spread code is subjected to BPSK (Binary Phase Shift Keying) modulation in accordance with the bit value of navigation message data. Specifically, for modulation at 50 bps (bit per second), the time for one bit of navigation message data is 20 milliseconds. That is, there is a possibility that the bit value of navigation message data is changed (transited) as "→1" or "1→0" for every 20 milliseconds. When there is a possibility, this means that the bit value may not be changed as "0→0" or "1→1".

In this embodiment, with regard to the timing which is reached for every 20 milliseconds, the timing at which the bit value of navigation message data can be changed (transited)

is defined as "bit transition timing". The bit transition timing corresponds to the time when the bit value of navigation message data is likely to be changed (transited), so-called a bit transition time (BTT).

The CA code is a fixed code which is repeated in the repetition cycle of 1 ms with a code length 1023 chips as 1 PN frame. With the BPSK modulation, one bit of navigation message data is expressed by the CA code of 20 cycles. With this modulation, if the correlation operation of the reception signal obtained by receiving the GPS satellite signal and the replica CA code is performed, before and after the bit value of navigation message data is changed, the correlation values having exactly reversed signs are obtained. Thus, when the correlation values are accumulated over the timing at which the bit value of navigation message data is changed, the correlation values having different signs are accumulated. As a result, the correlation values having different signs cancel each other, and the accumulated correlation value becomes small (extremely, 0), making it difficult to detect the peak for the accumulated correlation value.

The above-described problem is solved when the determination on whether or not the bit value of navigation message data at each bit transition timing is changed, that is, the presence/absence of a change in the bit value of navigation message data can be made. This is because, if the presence/absence of a change in the bit value of navigation message data is known, the signal can be adjusted such that the correlation values do not cancel each other, and the correlation values can be accumulated. This means that the correlation values can be accumulated over a longer period than 20 milliseconds as the bit length of navigation message data.

FIG. 1 is an explanatory view of the principle of bit change determination in this embodiment. In this embodiment, description will be provided assuming that the bit transition timing is known, and it is not necessary to detect the bit transition timing itself. Information regarding the bit transition timing can be acquired as assist data from, for example, an external apparatus. For this reason, in this embodiment, it is assumed that, while each bit transition timing of the reception signal is known, it is not known whether or not the bit value of navigation message data is actually changed at each bit transition timing.

In this embodiment, when the reception signal obtained by receiving the GPS satellite signal is segmented at the bit transition timing of navigation message data, each period separated at the bit transition timing is defined as a "unit period". A "period" is from a given start time to a given end time. The "unit period" is a period in which adjacent bit transition timings are set as the start time and the end time. The time of "20 milliseconds" between the start time and the end time of the unit period is defined as a "unit time".

In this embodiment, two types of periods of a "first pre-inspection period" having N (N≥1) continuous unit periods in time series and a "second pre-inspection period" having M (M>1) continuous unit periods adjacent to the first pre-inspection period are defined. The time of "N×20 milliseconds" between the start time and the end time of the first pre-inspection period is defined as a "first pre-inspection time". Similarly, the time of "M×20 milliseconds" between the start time and the end time of the second pre-inspection period is defined as a "second pre-inspection time". The total time of the first pre-inspection time and the second pre-inspection time is defined as an "inspection time", and the period which is determined by the first pre-inspection period and the second pre-inspection period is defined as an "inspection period".

Although in this embodiment, for convenience, a case has been described where the first and second pre-inspection periods are set from past to present (in order from the old one), the first and second pre-inspection periods may be set from present to past (in order from the new one).

Although the unit time is fixed (20 milliseconds), the first and second pre-inspection times may be appropriately changed depending on a system to be applied. Here, for example, a case where bit change determination is performed when the first and second pre-inspection times are "40 milliseconds (N=M=2)" two times longer than the unit time will be described in detail.

In FIG. 1, the horizontal direction represents time, and the vertical direction represents each measurement which is used for bit change determination in this embodiment. Although each measurement will be described below in detail, a line in the uppermost stage represents an I-phase correlation value, and a downward arrow represents the calculation timing of the I-phase correlation value. A line in the second stage represents a Q-phase correlation value, and a downward arrow represents the calculation time of the Q-phase correlation value. PSumI in the third stage and PSumQ in the fourth stage respectively represent an I-phase preliminary total value and a Q-phase preliminary total value which are the preliminary total values of an I component and a Q component. Power$^+$ in the fifth stage and Power$^-$ in the sixth stage respectively represent an additive power value and a subtractive power value which are used for preliminary bit change determination. SumI in the seventh stage and SumQ in the eighth stage respectively represent an I-phase total value and a Q-phase total value which are the total values of an I component and a Q component.

In FIG. 1, data of measurements surrounded by a one-dot-chain-line rectangle corresponds to a combination (data set) of data which is used for each round of bit change determination. A vertical bold line in the rectangle representing a data set represents the bit transition timing at which the presence/absence of a change in the bit value will be determined in the bit change determination. Specifically, in each bit change determination, a vertical bold line is shown at the bit transition timing corresponding to the boundary between the first pre-inspection period and the second pre-inspection period.

First, a correlation operation is performed on each of an in-phase component (I phase) and a quadrature component (Q phase) of an IQ-separated reception signal (hereinafter, called "reception IQ signal") and a replica CA code. Thus, an I-phase correlation value which is the correlation value of the I phase and a Q-phase correlation value which is the correlation value of the Q phase are obtained. The I phase represents the in-phase component (real part) of the reception signal, and the Q-phase represents the quadrature component (imaginary part) of the reception signal.

Next, with regard to each of the I-phase correlation value and the Q-phase correlation value, the correlation values are totalized at the respective calculation timings for each unit period to obtain the I-phase preliminary total value "PSumI" and the Q-phase preliminary total value "PSumQ" for each unit period. The calculated total value is called a "preliminary total value" because the total value is used preliminarily, and denoted by "PSum" in which "P" is attached in front of "Sum" representing a total value. The number "n=1, 2, 3, ..." of the unit period corresponding to each preliminary total value is put in parentheses. For example, the I-phase preliminary total value and the Q-phase preliminary total value of the first (n=1) unit period are respectively denoted by "PSumI (1)" and "PSumQ (1)".

Next, with regard to each of the first and second pre-inspection periods, a power value is calculated using the preliminary total value. Specifically, the preliminary total values of the unit periods in each pre-inspection period are totalized while a combination of addition and subtraction differs, and the power value is calculated using the totalization result. In FIG. 1, each of the first and second pre-inspection periods includes two unit periods. For this reason, the power value is calculated by two types of combinations (totalization methods) of a first combination (positive, positive) which is a totalization method when the preliminary total value of the first unit period is "positive" and the preliminary total value of the second unit period is "positive" and a second combination (positive, negative) which is a totalization method when the preliminary total value of the first unit period is "positive" and the preliminary total value of the second unit period is "negative".

In this embodiment, the power value which is calculated in accordance with the first combination (positive, positive) is called an "additive power value" and denoted by "Power$^+$". The power value which is calculated in accordance with the second combination (positive, negative) is called a "subtractive power value" and denoted by "Power$^-$". The numbers of the unit periods which are used to calculate the power value are put in parentheses while being separated by a comma in time series. For example, the additive power value and the subtractive power value which are calculated using the preliminary total value of the n-th unit period and the preliminary total value of the (n+1)th unit period are respectively denoted by "Power$^+$(n, n+1)" and "Power$^-$(n, n+1)".

The additive power value "Power$^+$(n, n+1)" and the subtractive power value "Power$^-$(n, n+1)" for the first pre-inspection period are respectively calculated by the following expressions (1) and (2).

$$\text{Power}^+(n,n+1) = \{P\text{Sum}I(n) + P\text{Sum}I(n+1)\}^2 + \{P\text{Sum}Q(n) + P\text{Sum}Q(n+1)\}^2 \quad (1)$$

$$\text{Power}^-(n,n+1) = \{P\text{Sum}I(n) - P\text{Sum}I(n+1)\}^2 + \{P\text{Sum}Q(n) - P\text{Sum}Q(n+1)\}^2 \quad (2)$$

Similarly, the additive power value "Power$^+$(n+2, n+3)" and the subtractive power value "Power$^-$(n+2, n+3)" for the second pre-inspection period are respectively calculated by the following expressions (3) and (4).

$$\text{Power}^+(n+2, n+3) = \{P\text{Sum}I(n+2) + P\text{Sum}I(n+3)\}^2 + \{P\text{Sum}Q(n+2) + P\text{Sum}Q(n+3)\}^2 \quad (3)$$

$$\text{Power}^-(n+2, n+3) = \{P\text{Sum}I(n+2) - P\text{Sum}I(n+3)\}^2 + \{P\text{Sum}Q(n+2) - P\text{Sum}Q(n+3)\}^2 \quad (4)$$

Although the combinations {(negative, negative), (negative, positive)} with reversed positive and negative signs with respect to the first and second combinations are also considered, if the power values are calculated for these combinations, the same results are obtained when the power values are calculated by the combinations {(positive, positive), (positive, negative)}. For this reason, it is not necessary to perform calculation for all the four combinations {(positive, positive), (positive, negative), (negative, positive), (negative, negative)}, and it should suffice that calculation is performed for either the combinations {(positive, positive), (positive, negative)} or the combinations {(negative, positive), (negative, negative)}.

Next, as a first preliminary determination for determining the presence/absence of a change in the bit value at the bit transition timing in the first pre-inspection period and a second preliminary determination for determining the presence/absence of a change in the bit value at the bit transition timing in the second pre-inspection period, preliminary determination on the presence/absence of a bit change is performed for each pre-inspection period.

Specifically, for each pre-inspection period, the magnitude of the calculated additive power value "Power$^+$" is compared with the magnitude of the calculated subtractive power value "Power$^-$". A larger power value is selected, and the combination of addition and subtraction which is used for calculating the selected power value is determined. The preliminary total values for the unit periods are totalized in accordance with the determined combination for each of the IQ components, and an I-phase total value "SumI" which is the total value of the I component and a Q-phase total value "SumQ" which is the total value of the Q component are obtained.

Detailed description will be provided focusing on the first pre-inspection period. If the additive power value "Power$^+$(n, n+1)" is larger than the subtractive power value "Power$^-$(n, n+1)" (Power$^+$(n, n+1)>Power$^-$(n, n+1)), a combination which causes an increase in the correlation value at the time of totalization is the first combination (positive, positive). This means that the bit value of navigation message data at the boundary between the n-th unit period and the (n+1)th unit period is not changed. For this reason, in this case, the preliminary total values are totalized in a state where the preliminary total value of the n-th unit period is "positive" and the preliminary total value of the (n+1) th unit period is "positive".

Specifically, the I-phase total value "SumI (n, n+1)" and the Q-phase total value "SumQ(n, n+1)" are calculated by the following expressions (5) and (6).

$$\text{Sum}I(n,n+1) = P\text{Sum}I(n) + P\text{Sum}I(n+1) \quad (5)$$

$$\text{Sum}Q(n,n+1) = P\text{Sum}Q(n) + P\text{Sum}Q(n+1) \quad (6)$$

Meanwhile, if the subtractive power value "Power$^-$(n,n+1)" is larger than the additive power value "Power$^+$(n,n+1)" (Power$^-$(n,n+1)>Power$^+$(n,n+1)), a combination which causes an increase in the correlation value at the time of totalization is the second combination (positive, negative). This means that the bit value of navigation message data at the boundary between the n-th unit period and the (n+1)th unit period is changed. For this reason, in this case, the preliminary total values are totalized in a state where the preliminary total value of the n-th unit period is "positive" and the preliminary total value of the (n+1)th unit period is "negative".

Specifically, the I-phase total value "SumI(n, n+1)" and the Q-phase total value "SumQ(n, n+1)" are calculated by the following expressions (7) and (8).

$$\text{Sum}I(n,n+1) = P\text{Sum}I(n) - P\text{Sum}I(n+1) \quad (7)$$

$$\text{Sum}Q(n,n+1) = P\text{Sum}Q(n) - P\text{Sum}Q(n+1) \quad (8)$$

For the second pre-inspection period, the preliminary total values are totalized in the same procedure to calculate the total value. That is, the magnitude of the additive power value "Power$^+$(n+2, n+3)" is compared with the magnitude of the subtractive power value "Power$^-$(n+2, n+3)". The I-phase total value "SumI(n+2, n+3)" and the Q-phase total value "SumQ(n+2, n+3)" are calculated in accordance with a combination of addition and subtraction corresponding to a larger power value.

When "Power$^+$(n+2, n+3)>Power$^-$(n+2, n+3)", the I-phase total value "SumI(n+2, n+3)" and the Q-phase total value "SumQ(n+2, n+3)" are calculated by the following expressions (9) and (10).

$$\text{Sum}I(n+2,n+3) = P\text{Sum}I(n+2) + P\text{Sum}I(n+3) \quad (9)$$

$$\mathrm{Sum}Q(n+2,n+3)=P\mathrm{Sum}Q(n+2)+P\mathrm{Sum}Q(n+3) \quad (10)$$

When "Power$^-$(n+2, n+3)>Power$^+$(n+2, n+3)", the I-phase total value "SumI(n+2, n+3)" and the Q-phase total value "SumQ(n+2, n+3)" are calculated by the following expressions (11) and (12).

$$\mathrm{Sum}I(n+2, n+3)=P\mathrm{Sum}I(n+2)-P\mathrm{Sum}I(n+3) \quad (11)$$

$$\mathrm{Sum}Q(n+2, n+3)=P\mathrm{Sum}Q(n+2)-P\mathrm{Sum}Q(n+3) \quad (12)$$

As understood from the expressions (1) to (4), the preliminary total values for the unit periods are totalized while changing the combination of addition and subtraction, and the power value is calculated using the totalization result. For this reason, in the course of calculating the power value, the total value "Sum" in each of the expressions (5) to (12) is inevitably calculated. Thus, in the actual processing, it should suffice that the total value "Sum" calculated in the course of calculating the power value is stored in a storage unit as intermediate data, and the total value "Sum" corresponding to the maximum power value is read from the storage unit and used.

The total value obtained in the above-described manner is the total value which is necessary for performing main determination (final determination) of the presence/absence of a bit change of navigation message data. For convenience, a vector which includes the I-phase total value and the Q-phase total value is defined as an "IQ total value vector", and denoted by "IQ" with a vector notation. For convenience of notation in the specification and the drawings, an arrow which means a vector is omitted in the specification but is described in the drawings without being omitted.

In the notations of the I-phase total value "SumI", the Q-phase total value "SumQ", and the IQ total value vector "IQ", the numbers of the unit periods which are used to calculate the total values are put in parentheses while being separated by a comma in time series. For example, the I-phase total value and the Q-phase total value calculated using the preliminary total values of the n-th unit period and the (n+1)th unit period are respectively denoted by "SumI (n,n+1)" and the "SumQ (n, n+1)", and collectively denoted by the IQ total value vector "IQ (n, n+1)".

With the above-described procedure, a first IQ total value vector "IQ (n, n+1)=[SumI (n, n+1), SumQ (n, n+1)]" is obtained for the first pre-inspection period, and a second IQ total value vector "IQ(n+2, n+3)=[SumI(n+2, n+3),SumQ(n+2, n+3)]" is obtained for the second pre-inspection period.

Next, an IQ inner product value "Dot (n+1|n+2)" is calculated by the following expression (13) using the first IQ total value vector "IQ (n, n+1)" and the second IQ total value vector "IQ (n+2, n+3)". The notation "Dot(a|b)" means the IQ inner product value for bit change determination at the boundary between an a-th unit period and a b-th unit period.

$$\begin{aligned}\mathrm{Dot}(n+1\mid n+2) &= \vec{IQ}(n, n+1)\cdot \vec{IQ}(n+2, n+3) \\ &= \mathrm{Sum}I(n, n+1)\times \mathrm{Sum}I(n+2, n+3) + \\ &\quad \mathrm{Sum}Q(n, n+1)\times \mathrm{Sum}Q(n+2, n+3)\end{aligned} \quad (13)$$

In the calculation of the expression (13), it is necessary to pay attention to the following points. When the bit value of navigation message data is changed at the boundary between the n-th unit period and the (n+1)th unit period, the signs of the preliminary total values of the n-th and (n+1)th unit periods are changed as "positive→negative" or "negative→positive". In this case, according to the expressions (7) and (8), subtraction is performed on the basis of the preliminary total value of the n-th unit period. That is, if the sign of the preliminary total value is changed as "positive→negative", subtraction is performed such that the sign of the total value "Sum" to be calculated becomes "positive". If the sign of the preliminary total value is changed as "negative→positive", subtraction is performed such that the sign of the total value "Sum" to be calculated becomes "negative".

Final determination will be performed on the presence/absence of a change in the bit value at the boundary between the (n+1)th unit period and the (n+2)th unit period. That is, whether or not the sign of the bit value of navigation message data in the (n+1)th unit period and the sign of the bit value of navigation message data in the (n+2)th unit period are different from each other becomes problematic. Thus, in the subtraction by the expressions (7) and (8), it is necessary that subtraction is performed on the basis of the preliminary total value of the (n+1)th unit period which is the unit period at the boundary. That is, if the sign of the preliminary total value is changed as "positive→negative" between the n-th unit period and the (n+1)th unit period, it is necessary that subtraction is performed such that the sign of the total value "Sum" to be calculated becomes "negative". If the sign of the preliminary total value is changed as "negative→positive", it is necessary that subtraction is performed such that the sign of the total value "Sum" to be calculated becomes "positive".

As a result of the preliminary determination, when it is determined that the bit value of navigation message data is changed at the boundary between the n-th unit period and the (n+1)th unit period, the positive and negative signs of the I-phase total value "SumI (n, n+1)" and the Q-phase total value "SumQ (n, n+1)" calculated by the expressions (7) and (8) are reversed and used when calculating the IQ inner product value. This corresponds to the calculation of the I-phase total value "SumI (n, n+1)" and the Q-phase total value "SumQ (n, n+1)" by the following expressions (14) and (15).

$$\mathrm{Sum}I(n,n+1)=P\mathrm{Sum}I(n+1)-P\mathrm{Sum}I(n) \quad (14)$$

$$\mathrm{Sum}Q(n,n+1)=P\mathrm{Sum}Q(n+1)-P\mathrm{Sum}Q(n) \quad (15)$$

For the (n+2)th and (n+3)th unit periods, it should suffice that subtraction is performed on the basis of the preliminary total value of the (n+2)th unit period which is the unit period at the boundary. That is, the I-phase total value "SumI (n+2, n+3)" and the Q-phase total value "SumQ (n+2, n+3)" are calculated by the expressions (9) to (12) and used for the calculation of the IQ inner product value "Dot (n+1|n+2)" of the expression (13).

Figure 2:
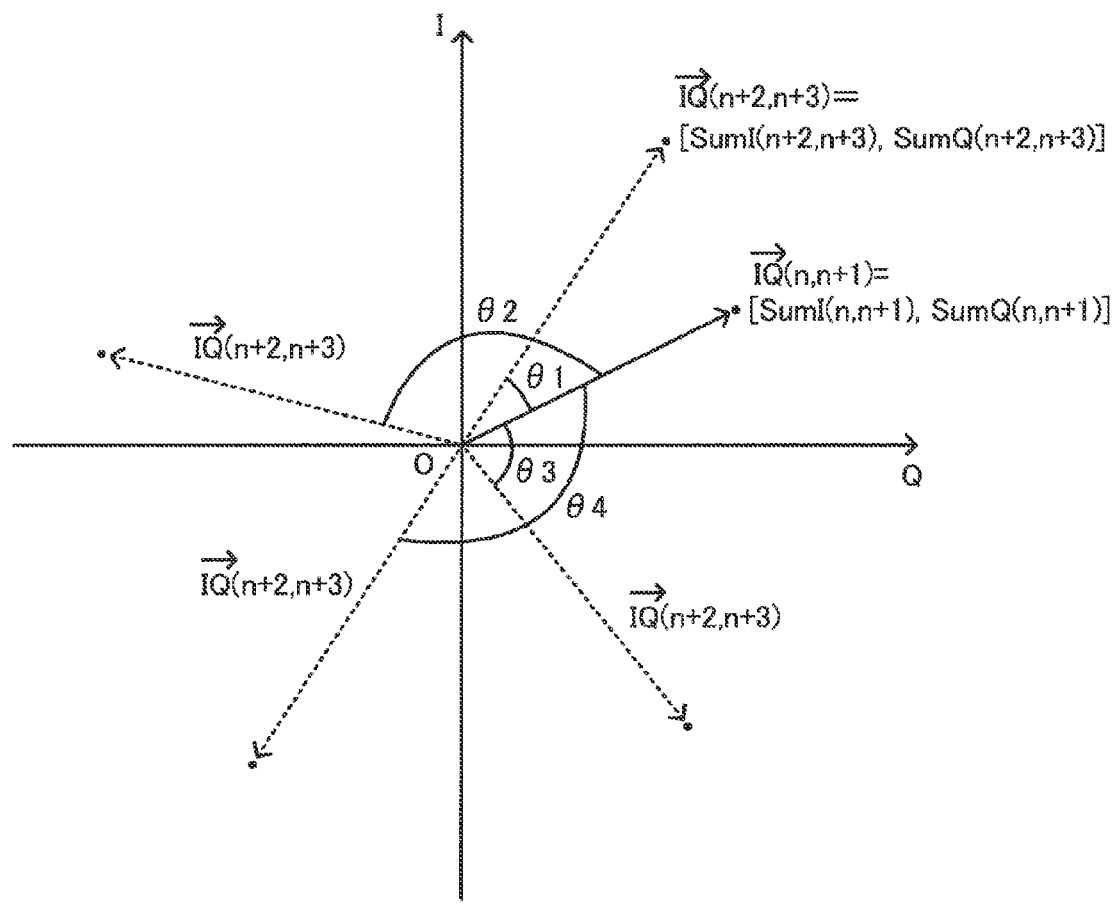
FIG. 2 is an explanatory view of an IQ inner product value.

FIG. 2 is an explanatory view of an IQ inner product value. FIG. 2 shows an IQ plane in which the horizontal axis corresponds to the Q phase and the vertical axis corresponds to the I phase. The first IQ total value vector "IQ (n, n+1)" and the second IQ total value vector "IQ (n+2, n+3)" are written in the IQ plane with the origin "0" as a start point. In FIG. 2, the first IQ total value vector "IQ (n, n+1)" is represented by a solid line, and the second IQ total value vector "IQ (n+2, n+3)" is represented by a dotted line.

The angle "θ" between the first IQ total value vector "IQ (n, n+1)" and the second IQ total value vector "IQ (n+2, n+3)" is defined as a "vector angle". For convenience, the sign of the vector angle "θ" when the second IQ total value vector is viewed in a counterclockwise direction on the basis of the first IQ total value vector is defined as "positive", and the sign of the vector angle "θ" when the second IQ total value vector is viewed in a clockwise direction on the basis of the first IQ total value vector is defined as "negative".

The calculation of the IQ inner product value "Dot" is the same as the calculation of the inner product of the first IQ total value vector and the second IQ total value vector. That is, the following expression (16) is established.

$$\text{Dot}(n+1|n+2) = |\vec{IQ}(n,n+1)| \times |\vec{IQ}(n+2,n+3)| \times \cos\theta \quad (16)$$

The positive and negative signs of the IQ inner product value "Dot" change depending on the cosine "cos θ" of the vector angle "θ". If the first IQ total value vector and the second IQ total value vector are in the same direction or substantially in the same direction ($-\pi/2 < \theta < \pi/2$), the IQ inner product value becomes positive (for example, a vector angle "θ1" or "θ3" in FIG. 2). This corresponds to a case where the bit value of navigation message data at the boundary between the first pre-inspection period and the second pre-inspection period is not changed.

Meanwhile, if the first IQ total value vector and the second IQ total value vector are in opposing directions or substantially in opposing directions ($-\pi \leq \theta \leq -\pi/2$, $\pi/2 \leq \theta \leq \pi$), the IQ inner product value becomes negative (for example, a vector angle "θ2" or "θ4" of FIG. 2). This corresponds to a case where the bit value of navigation message data at the boundary between the first pre-inspection period and the second pre-inspection period is changed.

From this, bit change determination is performed using the IQ inner product value "Dot" as follows. If the IQ inner product value "Dot (n+1|n+2)" calculated by the expression (13) is "negative" ("Dot (n+1|n+2)"<0), it is determined that the bit value at the boundary between the (n+1)th unit period and the (n+2)th unit period is changed (there is a bit change). Meanwhile, if the IQ inner product value "Dot (n+1|n+2)" is "positive" ("Dot (n+1|n+2)"≥0), it is determined that the bit value at the boundary between the (n+1)th unit period and the (n+2)th unit period is not changed (there is no bit change).

The above-described procedure is the procedure until a first bit change determination is performed. In this embodiment, as shown to be surrounded by a one-dot-chain line in FIG. 1, bit change determination is performed while shifting the time by the unit time. In this case, in a second determination, the presence/absence of a change in the bit value at the boundary between the (n+2)th unit period and the (n+3)th unit period is determined. In a third determination, the presence/absence of a change in the bit value at the boundary between the (n+3)th unit period and the (n+4)th unit period is determined.

In the above description, the preliminary determination based on the power value is the determination of the presence/absence of a bit change of navigation message data at the bit transition timing for each unit period in each pre-inspection period, and corresponds to preliminary determination which is performed prior to main determination. Though described below in a modification, the method for preliminary determination is not limited to the preliminary determination based on the power value, and any method may be used insofar as the presence/absence of a bit change at each bit transition timing in each pre-inspection period can be determined.

2. Example

Next, an example of a bit change determination device which performs bit change determination in accordance with the above-described principle will be described. Here, description will be provided as to an example when the invention is applied to a mobile phone which is a kind of electronic apparatus including a bit change determination device. It should be noted that an example to which the invention can be applied is not limited to the following example.

2-1. Functional Configuration of Mobile Phone

Figure 3:
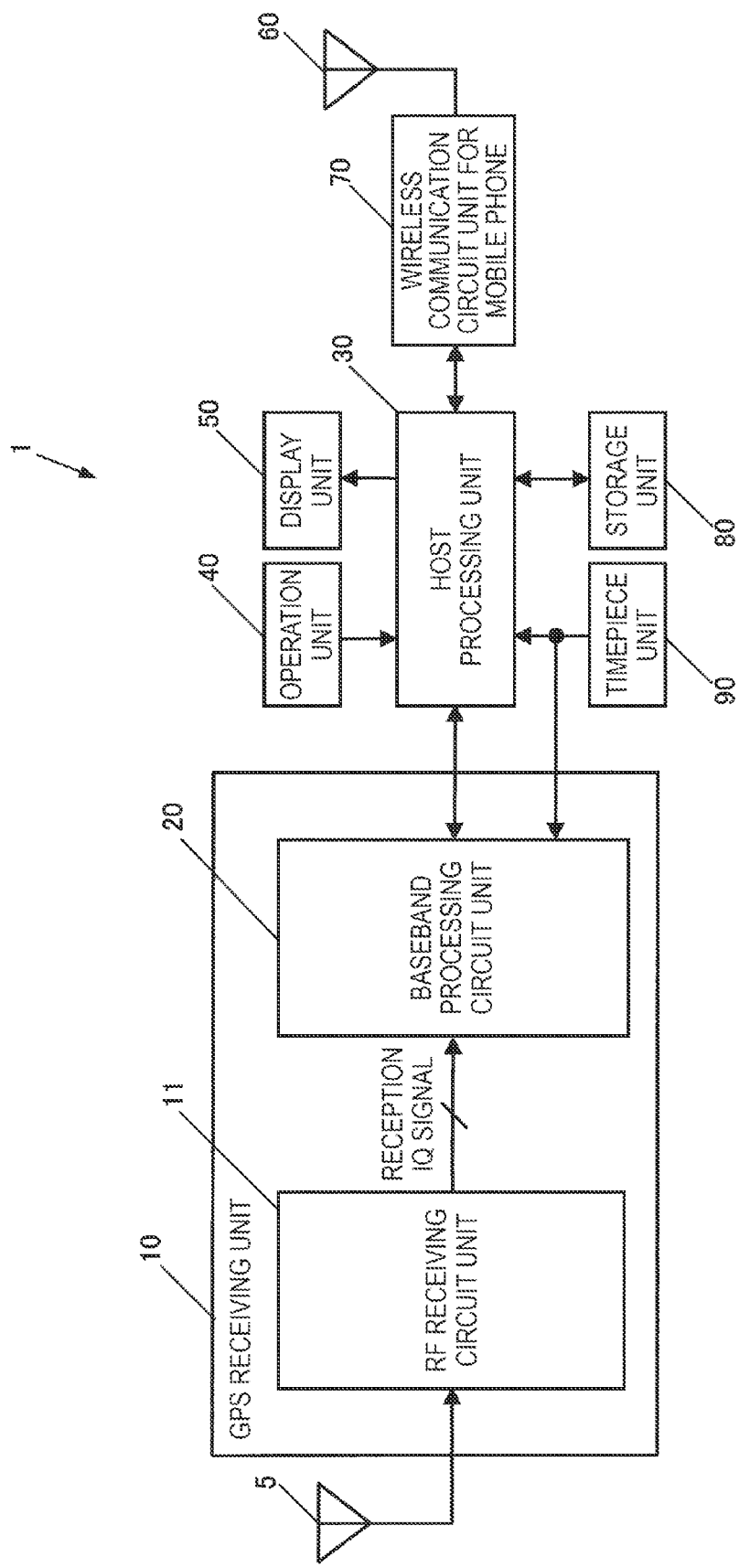
FIG. 3 is a block diagram showing an example of the functional configuration of a mobile phone.

FIG. 3 is a block diagram showing an example of the functional configuration of a mobile phone 1 in this example.

The mobile phone 1 includes a GPS antenna 5, a GPS receiving unit 10, a host processing unit 30, an operation unit 40, a display unit 50, a mobile phone antenna 60, a mobile phone wireless communication circuit unit 70, a storage unit 80, and a timepiece unit 90.

The GPS antenna 5 is an antenna which receives an RF (Radio Frequency) signal including a GPS satellite signal transmitted from a GPS satellite, and outputs a reception signal to the GPS receiving unit 10.

The GPS receiving unit 10 is a position calculation circuit or a position calculation device which measures the position of the mobile phone 1 on the basis of a signal output from the GPS antenna 5, and is a functional block corresponding to a so-called GPS receiving device. The GPS receiving unit 10 includes an RF receiving circuit unit 11 and a baseband processing circuit unit 20. The RF receiving circuit unit 11 and the baseband processing circuit unit 20 may be manufactured as separate LSIs (Large Scale Integration) or may be manufactured as one chip.

The RF receiving circuit unit 11 is a receiving circuit of an RF signal. For example, a receiving circuit may have a circuit configuration such that an RF signal output from the GPS antenna 5 is converted to a digital signal by an A/D converter and the digital signal is processed. Alternatively, a configuration may be made such that an RF signal output from the GPS antenna 5 is subjected to signal processing in a state of an analog signal and, after A/D conversion is finally performed, a digital signal is output to the baseband processing circuit unit 20.

In the latter case, for example, the RF receiving circuit unit 11 may be configured as follows. That is, a predetermined oscillation signal is frequency-divided or multiplied to generate an oscillation signal for RF signal multiplication. The generated oscillation signal is multiplied to the RF signal output from the GPS antenna 5 to down-convert the RF signal to an signal (hereinafter, referred to as "IF (Intermediate Frequency) signal") having an intermediate frequency, and the IF signal is amplified, converted to a digital signal by an A/D converter, and output to the baseband processing circuit unit 20.

The baseband processing circuit unit 20 is a processing circuit block which performs correlation processing on the reception signal output from the RF receiving circuit unit 11 to acquire a GPS satellite signal, and performs predetermined position calculation on the basis of satellite orbit data, time data, or the like extracted from the GPS satellite signal to calculate the position (position coordinate) of the mobile phone 1. The baseband processing circuit unit 20 has a correlation operation unit which performs a correlation operation on the reception signal, an acquisition unit which acquires a GPS satellite signal on the basis of the correlation operation result of the correlation operation unit, and the like.

The host processing unit 30 is a processor which performs overall control of the respective units of the mobile phone 1 in accordance with various programs, such as a system program, stored in the storage unit 80. The host processing unit 30 displays a map, on which the current position is indicated, on the display unit 50 together with the position coordinate acquired from the baseband processing circuit unit 20, or uses the position coordinate for various kinds of application processing.

The operation unit 40 is, for example, an input device, such as a touch panel or a button switch, and outputs a signal of a depressed key or button to the host processing unit 30. Various instructions, such as a call request, a mail transmission/reception request, and a position calculation request, are input by an operation of the operation unit 40.

The display unit 50 is a display device which has, for example, an LCD (Liquid Crystal Display) or the like, and performs various kinds of display on the basis of a display signal input from the host processing unit 30. A position display screen, time information, or the like is displayed on the display unit 50.

The mobile phone antenna 60 is an antenna which performs transmission and reception of a mobile phone wireless signal with a wireless base station provided by a communication service provider of the mobile phone 1.

The mobile phone wireless communication circuit unit 70 is a communication circuit unit of a mobile phone which has an RF conversion circuit, a baseband processing circuit, and the like, and performs modulation or demodulation of the wireless signal for a mobile phone to realize a call, mail transmission and reception, or the like.

The storage unit 80 is a storage device which stores a system program which is used when the host processing unit 30 controls the mobile phone 1 or various kinds of programs, data, or the like for executing various kinds of application processing.

The timepiece unit 90 includes an internal timepiece of the mobile phone 1, and includes an oscillation circuit, such as a crystal oscillator. The time of the timepiece unit 90 is output to the baseband processing circuit unit 20 and the host processing unit 30 as occasion demands.

2-2. Circuit Configuration of Baseband Processing Circuit Unit

Figure 4:
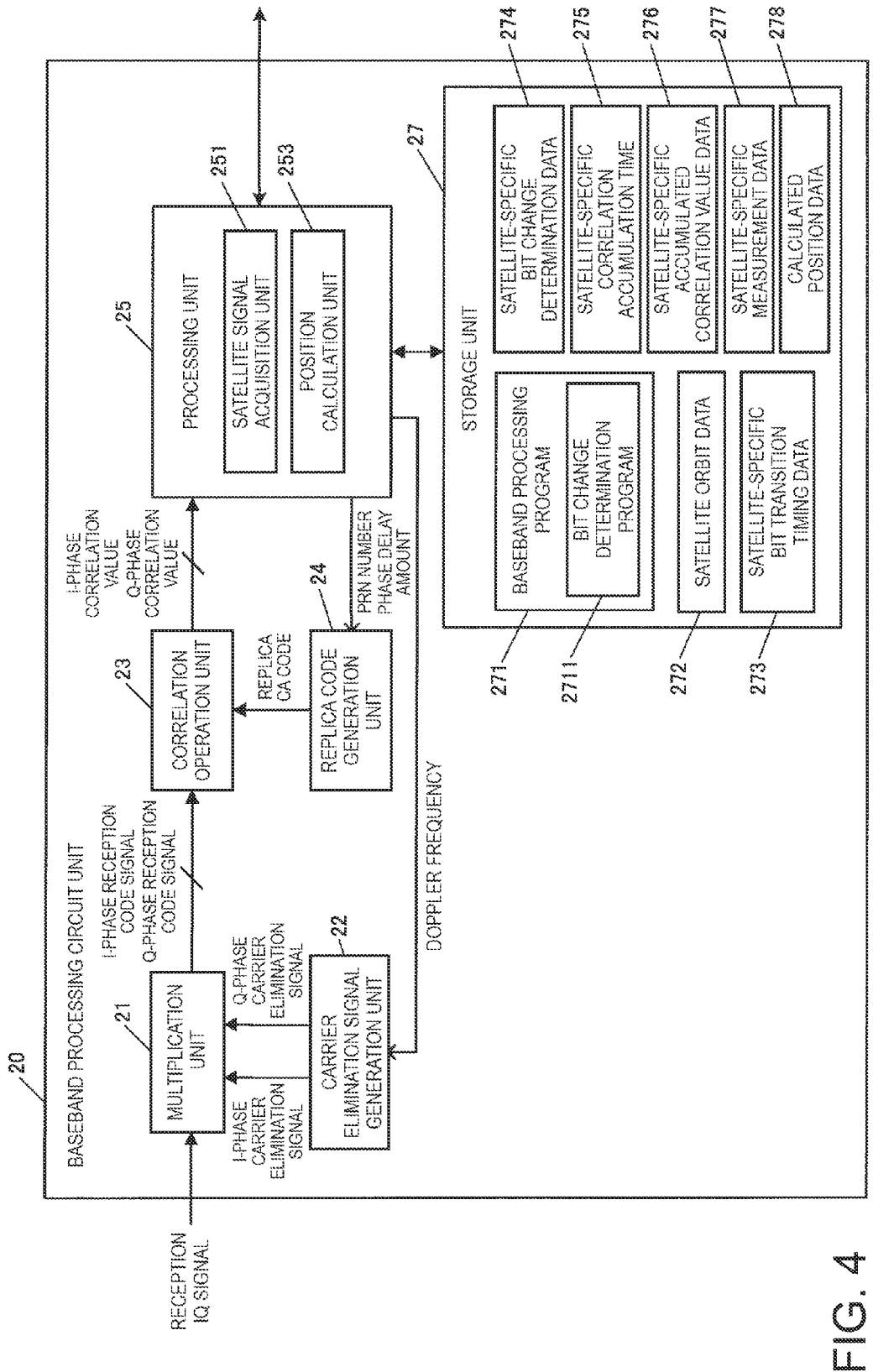
FIG. 4 is a diagram showing an example of the circuit configuration of a baseband processing circuit unit.

FIG. 4 is a diagram showing an example of the circuit configuration of the baseband processing circuit unit 20 centering on a circuit block of this example. The baseband processing circuit unit 20 includes, for example, a multiplication unit 21, a carrier elimination signal generation unit 22, a correlation operation unit 23, a replica code generation unit 24, a processing unit 25, and a storage unit 27.

The multiplication unit 21 is a circuit unit which multiplies the carrier elimination signal generated by the carrier elimination signal generation unit 22 to the reception IQ signal, which is the reception signals of the I phase and the Q phase, to eliminate carriers (carrier waves) from the reception IQ signal. The multiplication unit 21 has a multiplier or the like.

Although a circuit block which separates the IQ components of the reception signal (IQ separation) is not shown, for example, it should suffice that, when down-converting the reception signal to the IF signal in the RF receiving circuit unit 11, a local oscillation signal having a different phase by 90 degrees is multiplied to the reception signal, thereby performing the IQ separation.

When a signal output from the RF receiving circuit unit 11 is an IF signal, it should suffice that a carrier elimination signal having an IF frequency is generated. As described above, this embodiment can be substantially similarly applied to a case where the RF receiving circuit unit 11 down-converts the reception signal to the IF signal.

The carrier elimination signal generation unit 22 is a circuit which generates a carrier elimination signal having the same frequency as the frequency of the carrier signal of the GPS satellite signal, and has an oscillator, such as a carrier NCO (Numerical Controlled Oscillator). When the reception IQ signal is an IF signal, a signal having an IF frequency is generated. The carrier elimination signal generation unit 22 generates an I-phase carrier elimination signal for an I-phase reception signal and a Q-phase carrier elimination signal for a Q-phase reception signal, and outputs the I-phase and Q-phase carrier elimination signals to the multiplication unit 21. The Q-phase carrier elimination signal is a signal having a phase different from the I-phase carrier elimination signal by 90 degrees.

The carrier elimination signal generated by the carrier elimination signal generation unit 22 is multiplied to the reception IQ signal in the multiplication unit 21, such that the reception IQ signal is demodulated (detected), and a reception code signal with carriers eliminated is generated and output. That is, in the multiplication unit 21, the I-phase carrier elimination signal is multiplied to the I-phase reception signal, such that an I-phase reception code signal is generated, and the Q-phase carrier elimination signal is multiplied to the Q-phase reception signal, such that a Q-phase reception code signal is generated. The multiplication unit 21 and the carrier elimination signal generation unit 22 are also referred to as a demodulation unit (detection unit).

The correlation operation unit 23 is a circuit unit which performs a correlation operation of the I-phase and Q-phase reception code signals output from the multiplication unit 21 and the replica CA code generated by the replica code generation unit 24. The correlation operation unit 23 has a plurality of correlators or the like.

The replica code generation unit 24 is a circuit unit which generates a replica CA code as a replica simulating a CA code, and has an oscillator, such as a code NCO. The replica code generation unit 24 generates a replica CA code according to a PRN number (satellite number) designated by the processing unit 25 and outputs the replica CA code to the correlation operation unit 23. The correlation operation unit 23 performs a correlation operation of the I-phase and Q-phase reception code signals and the replica CA code generated by the replica code generation unit 24.

The processing unit 25 is a control device and an arithmetic unit which perform overall control of the respective functional parts of the baseband processing circuit unit 20, and has a processor, such as a CPU (Central Processing Unit). The processing unit 25 has, as main functional units, a satellite signal acquisition unit 251 and a position calculation unit 253.

The satellite signal acquisition unit 251 performs peak determination on the correlation operation results in the frequency direction and the phase direction output from the correlation operation unit 23 to detect the frequency (reception frequency) of the reception signal and the phase (code phase) of the received CA code. The detected reception frequency and code phase are used as measurement information for position calculation or the like.

In this embodiment, the satellite signal acquisition unit 251 functions as a first totalization unit which totalizes the correlation operation result of the correlation operation unit 23 for the first pre-inspection period or a second totalization unit which totalizes the correlation operation result of the correlation operation unit 23 for the second pre-inspection period. The satellite signal acquisition unit 251 also functions as a determination unit which determines the presence/absence of a change in the bit value at the bit transition timing of the boundary between the first pre-inspection period and the second pre-inspection period using the totalization results of the first and second totalization units.

The position calculation unit 253 performs known position calculation using measurement information detected and acquired by the satellite signal acquisition unit 251 for each acquisition-target satellite to calculate the position of the mobile phone 1. The calculated position is output to the host processing unit 30.

The storage unit 27 includes a storage device (memory), such as a ROM (Read Only Memory), a flash ROM, or a RAM (Random Access Memory), and stores the system program of the baseband processing circuit unit 20, various programs or data for realizing various functions, such as a satellite signal acquisition function and a position calculation function, or the like. The storage unit 27 also has a work area which temporarily stores data in process of various kinds of processing, processing results, or the like.

Figure 6:
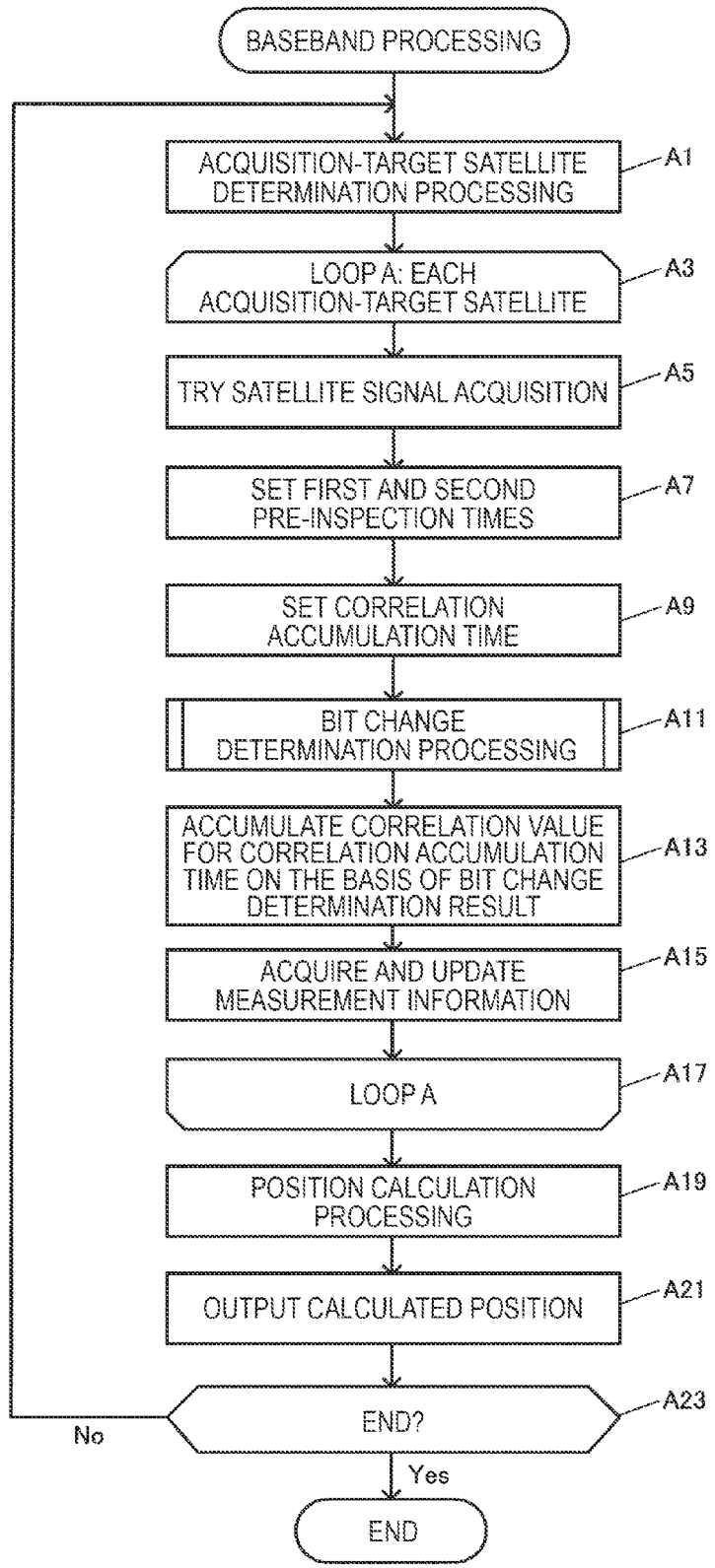
FIG. 6 is a flowchart showing the flow of baseband processing.

As shown in FIG. 4, the storage unit 27 stores, as a program, a baseband processing program 271 which is read by the processing unit 25 and executed as baseband processing (see FIG. 6). The baseband processing program 271 includes a bit change determination program 2711, which is executed as bit change determination processing (see FIG. 7), as a subroutine.

The baseband processing is processing in which the processing unit 25 acquires a GPS satellite signal using the I-phase and Q-phase correlation operation results output from the correlation operation unit 23 for each GPS satellite (hereinafter, referred to as "acquisition-target satellite") as an acquisition target, and performs position calculation using the acquired GPS satellite signal to calculate the position of the mobile phone 1.

The bit change determination processing is processing in which the processing unit 25 determines the presence/absence of changes in the bit values of navigation message data carried on the reception signal in accordance with the above-described principle. The baseband processing and the bit change determination processing will be described below in detail with reference to flowcharts.

The storage unit 27 stores, as data, satellite orbit data 272, satellite-specific bit transition timing data 273, satellite-specific bit change determination data 274, satellite-specific correlation accumulation time 275, satellite-specific accumulated correlation value data 276, satellite-specific measurement data 277, and calculated position data 278.

Satellite orbit data 272 is data, such as almanac in which schematic satellite orbit information of all the GPS satellites is stored or ephemeris in which detailed satellite orbit information is stored for each GPS satellite. Satellite orbit data 272 is acquired by decoding the GPS satellite signal received from the GPS satellite or is acquired as assist data from, for example, the base station of the mobile phone 1 or an assist server.

Satellite-specific bit transition timing data 273 is data in which the bit transition timing of navigation message data carried on the reception signal is stored for each acquisition-target satellite. Satellite-specific bit transition timing data 273 can be acquired as assist data from the base station of the mobile phone 1 or an external apparatus, such as an assist server. The method of generating or acquiring satellite-specific bit transition timing data 273 is known in the related art, and detailed description thereof will be omitted.

Satellite-specific bit change determination data 274 is data which is used for the bit change determination of navigation message data carried on the reception signal for each acquisition-target satellite, and a data configuration example thereof is shown in FIG. 5. Satellite-specific bit change determination data 274 stores bit change determination data by acquisition-target satellite. Bit change determination data stores a satellite number 2741 which is the number of the acquisition-target satellite, a first pre-inspection time 2743, a second pre-inspection time 2745, measurement data 2747, and a bit change determination result 2749.

The satellite number 2741 is the number for uniquely identifying each GPS satellite. The first pre-inspection time 2743 is the time which is determined by the number "N" of continuous unit periods, and is set to, for example, a predetermined value. The second pre-inspection time 2745 is the time which is determined by the number "M" of continuous unit periods, and is set to, for example, a predetermined value. One feature is that the first pre-inspection time 2743 and the second pre-inspection time 2745 are set for each acquisition-target satellite.

Measurement data 2747 is data in which measurements for bit change determination are stored in a table format in association with the time. Specifically, the times "t=t1, t2, t3, t4, t5, t6, ... " in terms of the unit time are arranged in the horizontal direction of the table, and the measurements are arranged in the vertical direction of the table, such that data of the measurements at the respective times is stored in a matrix. With regard to the time at which no measurement is calculated, "–(none)" is described in the column of the measurement.

The measurements include the I-phase preliminary total value "PSumI" and the Q-phase preliminary total value "PSumQ", the power values "Power+" and "Power−" for the first and second pre-inspection periods, the I-phase total value "SumI" and the Q-phase total value "SumQ" for the first and second pre-inspection periods, and the IQ inner product value "Dot".

For example, bit change determination data shown on the nearest side of FIG. 5 is data for an acquisition-target satellite having the satellite number 2741 of "SV1". The first pre-inspection time 2743 is set to 40 milliseconds (N=2), and the second pre-inspection time 2745 is set to 40 milliseconds (M=2) which is the same time as the first pre-inspection time.

Since the preliminary total values "PSumI, PSumQ" are calculated for each unit time (20 milliseconds), the preliminary total values "PSumI, PSumQ" are stored at each of the times "t1, t2, t3, t4, t5, t6, ... ". The power values "Power+, Power−" of the first pre-inspection period are initially calculated when the first pre-inspection time (40 milliseconds) has elapsed, and are subsequently calculated each time the unit time elapses. For this reason, no data is stored at the time "t1", and data is stored at each time since the time "t2".

The power values "Power+, Power−" of the second pre-inspection period are initially calculated when the inspection time (80 milliseconds) which is the sum of the first and second pre-inspection times has elapsed, and are subsequently calculated each time the unit time elapses. For this reason, no data is stored at the times "t1 to t3", and data is stored at each time since the time "t4".

Since the total values "PSumI, PSumQ" are calculated on the basis of the preliminary determination result, and calculated and stored in time with the timing at which the power values are calculated and stored. That is, for the first pre-inspection period, data of the total values at each time since the time "t2" is stored in time with data of the power values. For the second pre-inspection period, data of the total values is stored at each time since the time "t4".

The main determination of the presence/absence of a change in the bit value is initially performed at the time "t4" after the inspection time has elapsed, and is subsequently performed each time the unit time elapses. In the first main determination, the IQ inner product value "Dot (2|3)" is calculated using data "SumI (1,2), SumQ (1,2)" of the total values at the time "t2" and data "SumI (3, 4), SumQ (3, 4)" of the total values at the time "t4". The presence/absence of a change in the bit value at the time "t2" is determined on the basis of the IQ inner product value "Dot (2|3)".

The bit change determination result 2749 stores the result of the main determination of a bit change in time series. Specifically, "present" is stored at the time at which there is a bit change, and "absent" is stored at the time at which there is no bit change. "–(none)" is described at the time at which the bit change determination is not performed.

In the data example of FIG. 5, since the first pre-inspection time and the second pre-inspection time are the same (N=M=2), as a result, the power values and the total values which are calculated at each time since the time "t4" are the same in the first and second pre-inspection periods. For this reason, data of the power values and the total values in the second pre-inspection period hatched in FIG. 5 can be omitted, and only data of the power values and the total values at the first pre-inspection time maybe stored. As described above, when the first pre-inspection time and the second pre-inspection time are the same, since overlapping data is generated, only one piece of data maybe stored, thereby saving the memory.

Returning to the description of the data configuration, the satellite-specific correlation accumulation time 275 is data in which the correlation accumulation time for each acquisition-target satellite is stored. Satellite-specific accumulated correlation value data 276 is data in which the accumulated correlation value obtained by accumulating the correlation values for the correlation accumulation time is stored for each acquisition-target satellite.

Satellite-specific measurement data 277 is data in which measurement information acquired by peak determination on the accumulated correlation value is stored by acquisition-target satellite. Specifically, for each acquisition-target satellite, information regarding the reception frequency and the code phase is stored as measurement information.

Calculated position data 278 is position data of the mobile phone 1 which is calculated by the position calculation processing in the position calculation unit 253. Calculated position data 278 may be time-series data in which the calculated position is accumulated and stored in time series or data in which only the latest calculated position is updated and stored.

2-3. Flow of Processing

FIG. 6 is a flowchart showing the flow of baseband processing which is performed in the baseband processing circuit unit 20 when the baseband processing program 271 stored in the storage unit 27 is read by the processing unit 25.

Initially, the satellite signal acquisition unit 251 performs acquisition-target satellite determination processing (Step A1). Specifically, at the current time counted by the timepiece unit 90, a GPS satellite at a given reference position in the sky is determined using satellite orbit data 272, such as almanac or ephemeris, stored in the storage unit 27 to determine an acquisition-target satellite. For example, in the case of a first position calculation after power is applied, the reference position is acquired from an assist server by so-called server assist, and in the case of a second or subsequent position calculation, the reference position can be set by a method which sets the latest calculated position as the reference position, or the like.

Next, the satellite signal acquisition unit 251 performs the processing of a loop A for each acquisition-target satellite determined in Step A1 (Steps A3 to A17). In the processing of the loop A, the satellite signal acquisition unit 251 tries to acquire a GPS satellite signal from the acquisition-target satellite (Step A5). That is, the carrier elimination signal generation unit 22 and the replica code generation unit 24 are controlled to perform the carrier elimination and correlation operation on the reception IQ signal output from the RF receiving circuit unit 11. The I-phase correlation value and the Q-phase correlation value are acquired from the correlation operation unit 23.

Next, the satellite signal acquisition unit 251 sets the first and second pre-inspection times for the acquisition-target satellite (Step A7). That is, each of the value "N" for determining the first pre-inspection time and the value "M" for determining the second pre-inspection time is set to a predetermined value. The set values are stored in satellite-specific bit change determination data 274.

The satellite signal acquisition unit 251 sets the correlation accumulation time for the acquisition-target satellite (Step A9). In this embodiment, the bit change determination processing is performed to determine the presence/absence of a change in the bit value, making it possible to accumulate the correlation value over a time longer than the unit time. For this reason, the time longer than the unit time is set as the correlation accumulation time. For example, the time which is an integer multiple of the unit time (for example, 200 milliseconds ten times longer than the unit time) is set as the correlation accumulation time.

Thereafter, the satellite signal acquisition unit 251 performs the bit change determination processing in accordance with the bit change determination program 2711 of the storage unit 27 (Step A11).

Figure 7:
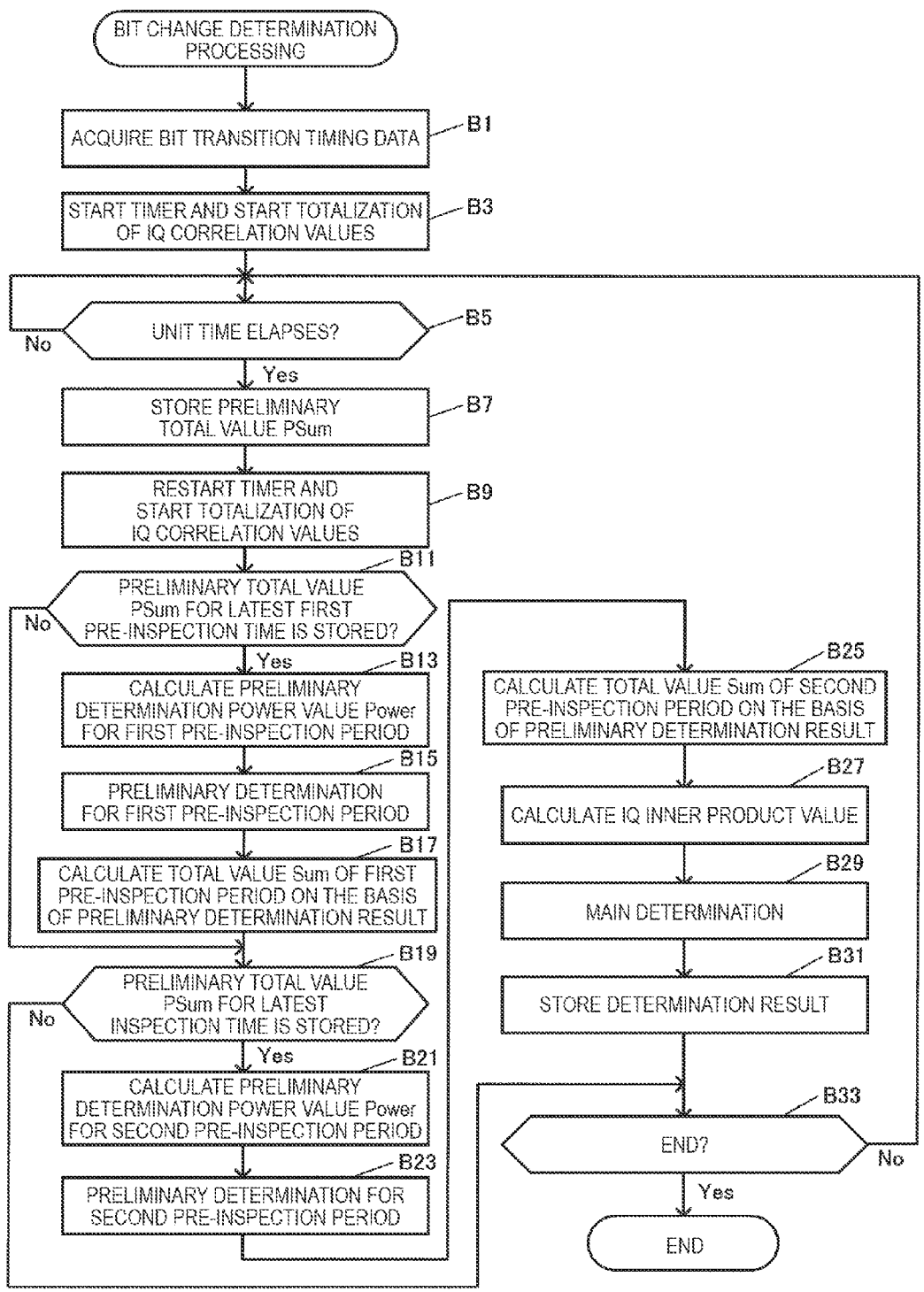
FIG. 7 is a flowchart showing the flow of bit change determination processing.

FIG. 7 is a flowchart showing the flow of the bit change determination processing.

Initially, the satellite signal acquisition unit 251 acquires bit transition timing data for the acquisition-target satellite from the outside, and stores the bit transition timing data in satellite-specific bit change determination data 274 (Step B1). The satellite signal acquisition unit 251 starts a timer and starts to totalize the I-phase correlation value and the Q-phase correlation value output from the correlation operation unit 23 (Step B3). The satellite signal acquisition unit 251 waits until the unit time elapses (Step B5; No).

If the unit time elapses (Step B5; Yes), the satellite signal acquisition unit 251 stores the total value of the IQ components in measurement data 2747 of satellite-specific bit change determination data 274 as the preliminary total value "PSum" (Step B7). The satellite signal acquisition unit 251 restarts the timer and starts to totalize the IQ correlation values again (Step B9).

Next, the satellite signal acquisition unit 251 determines whether or not the preliminary total value "PSum" for the latest first pre-inspection time is stored in measurement data 2747 (Step B11). When it is determined that the preliminary total value "PSum" is stored (Step B11; Yes), the power value "Power" is calculated for the first pre-inspection period (Step B13).

Thereafter, the satellite signal acquisition unit 251 performs the preliminary determination for the first pre-inspection period using the power value "Power" calculated in Step B13 (Step B15). The satellite signal acquisition unit 251 calculates the total value "Sum" of the first pre-inspection period on the basis of the preliminary determination result (Step B17).

Specifically, for example, in the case of "N=2", when it is determined by the preliminary determination in Step B15 that a bit change does not occur at the boundary between the n-th unit period and the (n+1)th unit period, the I-phase total value "SumI(n, n+1)" and the Q-phase total value "SumQ(n, n+1)" are calculated by the expressions (5) and (6). When it is determined that a bit change occurs at the boundary between the n-th unit period and the (n+1)th unit period, the I-phase total value "SumI(n, n+1)" and the Q-phase total value "SumQ(n, n+1)" are calculated by the expressions (14) and (15).

Next, the satellite signal acquisition unit 251 determines whether or not the preliminary total value "PSum" for the latest inspection time is stored in measurement data 2747 (Step B19). When it is determined that the preliminary total value "PSum" is stored (Step B19; Yes), the power value "Power" is calculated for the second pre-inspection period (Step B21).

Thereafter, the satellite signal acquisition unit 251 performs the preliminary determination for the second pre-inspection period using the power value "Power" calculated in Step B21 (Step B23). The satellite signal acquisition unit 251 calculates the total value "Sum" of the second pre-inspection period on the basis of the preliminary determination result (Step B25).

Specifically, for example, in the case of "M=2", when it is determined by the preliminary determination in Step B23 that a bit change does not occur at the boundary between the (n+2)th unit period and the (n+3)th unit period, the I-phase total value "SumI(n+2, n+3)" and the Q-phase total value "SumQ(n+2, n+3)" are calculated by the expressions (9) and (10). When it is determined that a bit change occurs at the boundary between the (n+2)th unit period and the (n+3)th unit period, the I-phase total value "SumI(n+2, n+3)" and the Q-phase total value "SumQ(n+2, n+3)" are calculated by the expressions (11) and (12).

When it is determined in Step B11 that the preliminary total value for the latest first pre-inspection time is not stored (Step B11; No), the satellite signal acquisition unit 251 progresses the processing to Step B19. When it is determined in Step B19 that the preliminary total value for the latest inspection time is not stored (Step B19; No), the satellite signal acquisition unit 251 progresses the processing to Step B33.

After the processing of Step B25, the satellite signal acquisition unit 251 calculates the IQ inner product value using the total value "Sum" of the first pre-inspection period calculated in Step B17 and the total value "Sum" of the second pre-inspection period calculated in Step B25 (Step B27). The satellite signal acquisition unit 251 performs the main determination of the presence/absence of a bit change using the calculated IQ inner product value (Step B29). The satellite signal acquisition unit 251 stores the result of the main determination in satellite-specific bit change determination data 274 as the bit change determination result 2749 (Step B31).

The satellite signal acquisition unit 251 determines whether or not to end the processing (Step B33), and when it is determined not to end the processing yet (Step B33; No), and returns to Step B5. When it is determined to end the processing (Step B33; Yes), the bit change determination processing ends.

Returning to the baseband processing of FIG. 6, after the bit change determination processing is performed, the satellite signal acquisition unit 251 accumulates the correlation values for the correlation accumulation time set in Step A9 on the basis of the bit change determination result 2749 of the acquisition-target satellite stored in satellite-specific bit change determination data 274 (Step A13). Specifically, before and after the bit transition timing at which it is determined there is no bit change, the correlation values of the unit periods are accumulated while the signs of the correlation values remain unchanged. Before and after the bit transition timing at which it is determined there is a bit change, the correlation values of the unit periods are accumulated while the signs of the correlation values are reversed.

The satellite signal acquisition unit 251 performs the peak determination on the accumulated correlation value acquired in Step A13 to acquire the measurement information of the acquisition-target satellite and stores the measurement information in satellite-specific measurement data 277 (Step A15). The satellite signal acquisition unit 251 progresses the processing to the next acquisition-target satellite.

After the processing of Steps A5 to A15 is performed for all the acquisition-target satellites, the satellite signal acquisition unit 251 ends the processing of the loop A (Step A17). Thereafter, the position calculation unit 253 performs the position calculation processing for calculating the position of the mobile phone 1 using the measurement information for each acquisition-target satellite stored in the satellite-specific measurement data 277 (Step A19). In the position calculation processing, known position calculation using, for example, a least-squares method or a Kalman filter is performed using the pseudo distance between the mobile phone 1 and each acquisition-target satellite.

The pseudo distance can be calculated as follows. That is, the integer part of the pseudo distance between each acquisition-target satellite and the mobile phone 1 is calculated using the satellite position of each acquisition-target satellite obtained from satellite orbit data 272 and the schematic position of the mobile phone 1. The fractional part of the pseudo distance between each acquisition-target satellite and the mobile phone 1 is calculated using the code phase which is the measurement information. The integer part and the fractional part obtained in the above-described manner are totalized to obtain the pseudo distance.

Next, the position calculation unit 253 outputs the position (position coordinate) calculated by the position calculation processing to the host processing unit 30 (Step A21). The processing unit 25 determines whether or not to end the processing (Step A23), and when it is determined not to end the processing yet (Step A23; No), returns to Step A1. When it is determined to end the processing (Step A23; Yes), the baseband processing ends.

3. Experiment Result

Figure 8:
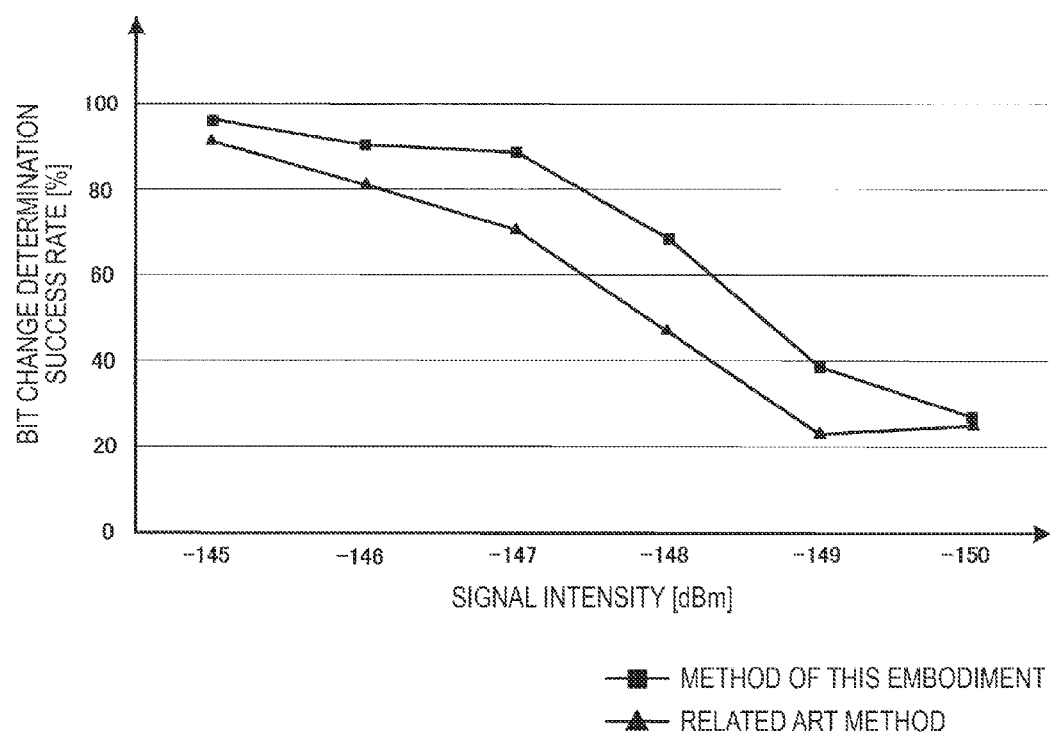
FIG. 8 is a diagram showing an example of an experiment result.

FIG. 8 is a diagram showing an example of an experiment result when the bit change determination of navigation message data is actually performed using the bit change determination method of this embodiment. An experiment was carried out in which, in a situation in which the signal intensity of the reception signal of the GPS satellite signal was changed, the bit change determination of navigation message data was performed for each signal intensity, and the success rate was measured.

In FIG. 8, the horizontal axis represents the signal intensity (the unit is dBm) of the reception signal, and the vertical axis represents the success rate (the unit is %) of the bit change determination. A rectangular plot represents the success rate when the bit change determination was performed by the method of this embodiment, and a triangular plot represents the success rate when the bit change determination was performed by the method in the related art.

Referring to FIG. 8, it can be understood that, for all the signal intensities, the success rate by the method of this embodiment exceeds the success rate by the method in the related art. In particular, it can be understood that, in a range of the signal intensity "−145 dBm to −147 dBm", the success rate by the method of this embodiment has a large value equal to or higher than 90%. If the signal intensity was lower, the success rate gradually decreased, and there was no change in the tendency that the success rate by the method of this embodiment exceeds the success rate by the method in the related art. Thus, the effectiveness of the method of this embodiment was verified.

4. Functional Effect

According to this embodiment, the correlation operation of the reception signal obtained by receiving the GPS satellite signal and the replica CA code is performed. The preliminary determination is performed as the first preliminary determination for determining the presence/absence of a change (transition) in the bit value at the bit transition timing in the first pre-inspection period having N (N≥1) continuous unit periods and the second preliminary determination for determining the presence/absence of a change (transition) in the bit value at the bit transition timing in the second pre-inspection period having M (M>1) continuous unit periods adjacent to the first pre-inspection period. The preliminary total values of the unit periods are totalized for the pre-inspection time on the basis of the result of the preliminary determination. The IQ inner product value is calculated using the total values calculated for the first and second pre-inspection periods, and the presence/absence of a change in the bit value of navigation message data at the boundary between the first pre-inspection period and the second pre-inspection period is determined on the basis of the IQ inner product value.

The first and second pre-inspection periods each having a plurality of continuous unit periods are set, and the IQ inner product value is calculated using the total values of the correlation operation results for the pre-inspection periods. Thus, it is possible to obtain an IQ inner product value suitable for bit change determination compared to the related art in which the total values of the correlation operation results of two continuous unit periods are used. If the first and second pre-inspection times are extended, an IQ inner product value suitable for bit change determination is obtained by much, thereby accurately performing bit change determination. This method is particularly effective in a weak electric field environment in which a received GPS satellite signal becomes a weak electric field signal.

When the GPS satellite signal is initially received, the bit change determination is performed when the inspection time which is the sum of the first and second pre-inspection times has elapsed. For this reason, only if an appropriate value is set as the first and second pre-inspection times, it is possible to reduce the time necessary for the initial acquisition of the GPS satellite signal and to reduce the time (TTFF (Time To First Fix) by the initial position calculation. Since data necessary for a single bit change is data for the inspection time, a necessary memory capacity is small.

In this embodiment, the preliminary total value is calculated for each unit period, and the preliminary total values are totalized while varying a combination of addition and subtraction, thereby calculating the power values. The preliminary total values of the unit periods are totalized by a totalization method according to the combination of addition and subtraction in which the maximum power value is obtained. Thus, the presence/absence of a bit change at each bit transition timing in the pre-inspection period is temporarily determined, thereby appropriately obtaining the IQ inner product value.

5. Modification

5-1. Bit Change Determination

In the above-described embodiment, the power values are calculated using the preliminary total values, and the preliminary determination of a bit change is performed on the basis of the magnitude of the power value. However, the IQ inner product value maybe calculated without calculating the power values, thereby performing the preliminary determination.

Figure 9:
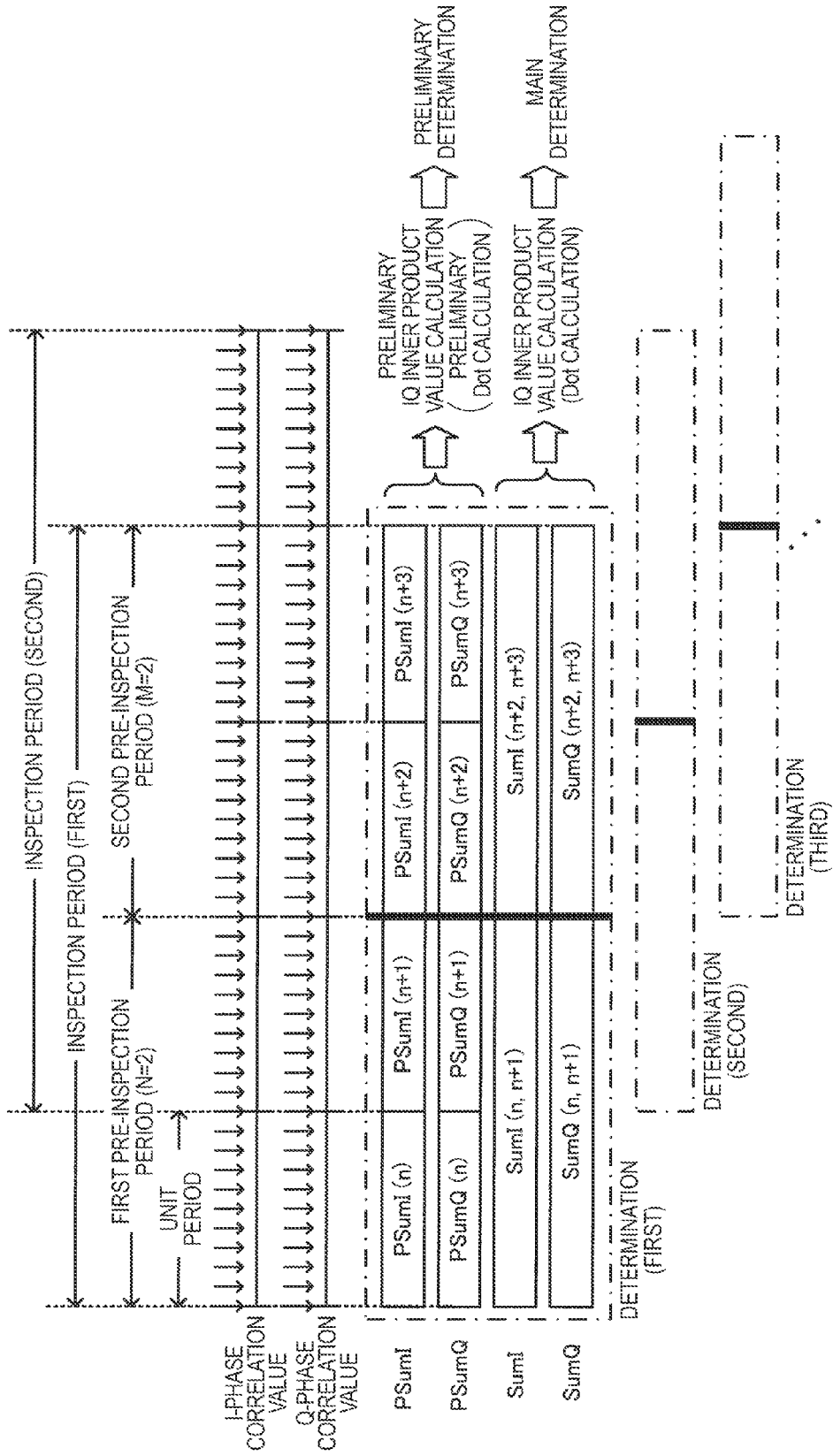
FIG. 9 is an explanatory view of the principle of bit change determination in a modification.

FIG. 9 is an explanatory view of the principle of bit change determination in this case. FIG. 9 corresponds to FIG. 1, and the point of view thereof is the same as FIG. 1. In a method of FIG. 9, for each of the first and second pre-inspection periods, a preliminary IQ inner product value is calculated for two adjacent unit periods using the preliminary total values calculated for the unit periods.

For the first pre-inspection period, a preliminary IQ inner product value "Dot (n|n+1)" is calculated by the following expression (17) using the I-phase preliminary total value "PSumI(n)" and the Q-phase preliminary total value "PSumQ(n)" of the n-th unit period and the I-phase preliminary total value "PSumI(n+1)" and the Q-phase preliminary total value "PSumQ(n+1)" of the (n+1)th unit period.

$$\text{Dot}(n|n+1)=P\text{Sum}I(n)\times P\text{Sum}I(n+1)+P\text{Sum}Q(n)\times P\text{Sum}Q(n+1) \quad (17)$$

The presence/absence of a bit change at the bit transition timing of the boundary between the unit periods constituting the first pre-inspection period is preliminarily determined on the basis of the calculated preliminary IQ inner product value. That is, if the preliminary IQ inner product value "Dot (n|n+1)" is "negative" (Dot (n|n+1)<0), it is determined that the bit value is changed at the boundary between the n-th unit period and the (n+1)th unit period. If the preliminary IQ inner product value "Dot (n|n+1)" is "positive" (Dot (n|n+1)≥0), it is determined that the bit value is not changed at the boundary between the n-th unit period and the (n+1)th unit period.

Similarly, for the second pre-inspection period, a preliminary IQ inner product value "Dot (n+2|n+3)" is calculated by the following expression (18) using the I-phase preliminary total value "PSumI (n+2)" and the Q-phase preliminary total value "PSumQ (n+2)" of the (n+2)th unit period and the I-phase preliminary total value "PSumI (n+3)" and the Q-phase preliminary total value "PSumQ (n+3)" of the (n+3)th unit period.

$$\text{Dot}(n+2|n+3)=P\text{Sum}I(n+2)\times P\text{Sum}I(n+3)+P\text{Sum}Q(n+2)\times P\text{Sum}Q(n+3) \quad (18)$$

If the preliminary IQ inner product value "Dot (n+2|n+3)" is "negative" (Dot (n+2|n+3)<0), it is determined that the bit value is changed at the boundary between the (n+2)th unit period and the (n+3)th unit period. If the preliminary IQ inner product value "Dot (n+2|n+3)" is "positive" (Dot (n+2|n+3)≥0), it is determined that the bit value is not changed at the boundary between the (n+2)th unit period and the (n+3)th unit period.

After the preliminary determination of a bit change is performed in the above-described manner, the I-phase total value "PSumI" and the Q-phase total value "PSumQ" are calculated on the basis of the preliminary determination result. Subsequent processing is the same as in the above-described embodiment.

5-2. Pre-Inspection Time

Although in the above-described embodiment, an example has been described where the bit change determination is performed while the first and second pre-inspection times are 40 milliseconds (N=M=2), the first and second pre-inspection times may be set to appropriate values. For example, the bit change determination is performed while the first and second pre-inspection times are 60 milliseconds (N=M=3).

Figure 10:
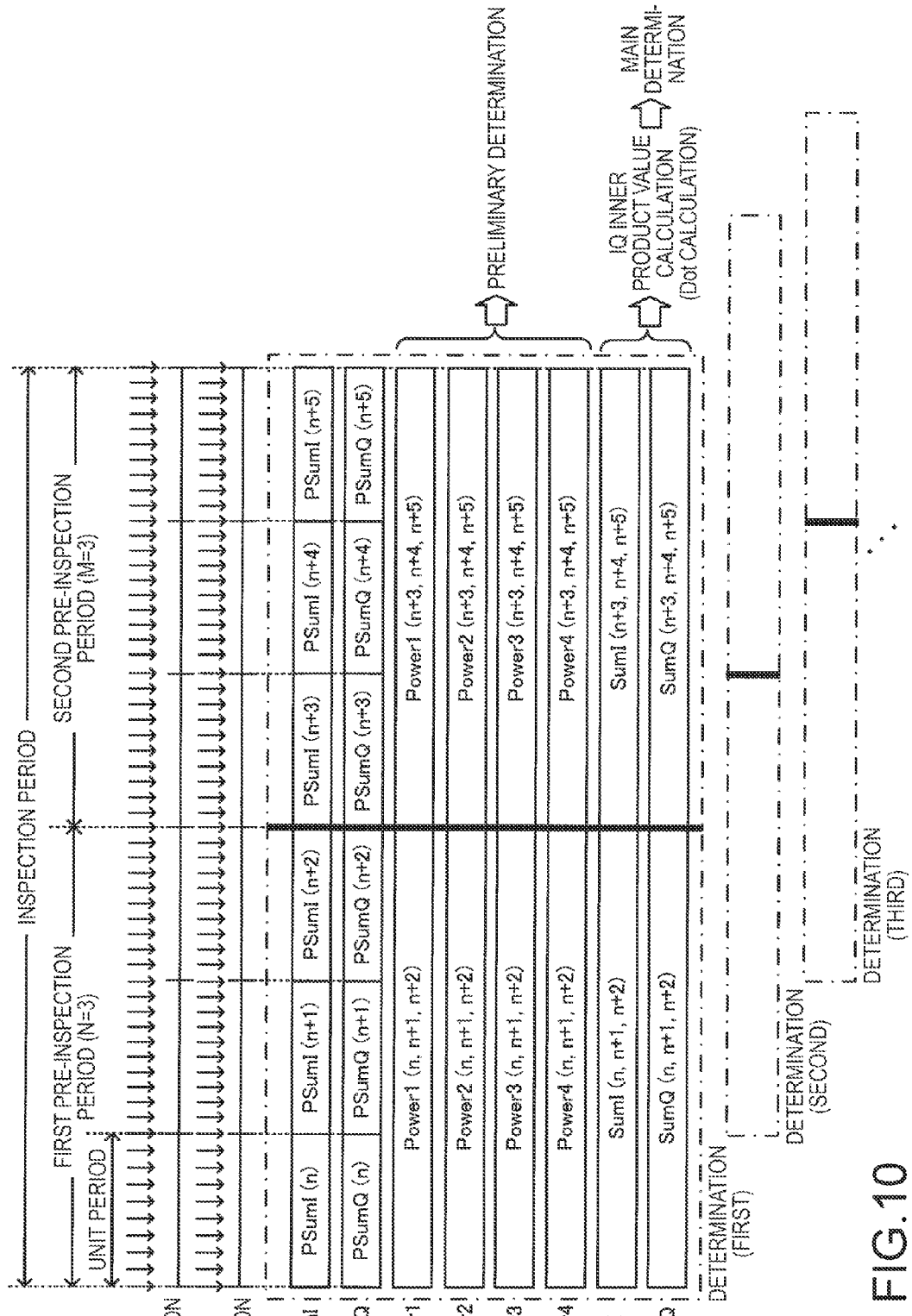
FIG. 10 is an explanatory view of the principle of bit change determination in a modification.

FIG. 10 is an explanatory view of the principle of bit change determination in this case. The point of view of FIG. 10 is the same as FIG. 1. First, for each of unit periods constituting a first pre-inspection period, a preliminary total value is calculated for each of the IQ components. Thus, the I-phase preliminary total values "PSumI (n), PSumI (n+1), PSumI (n+2)" and the Q-phase preliminary total values "PSumQ (n), PSumQ (n+1), PSumQ (n+2)" are obtained.

Similarly, with regard to the second pre-inspection period, for each of three unit period constituting the second pre-inspection period, the I-phase preliminary total values "PSumI (n+3), PSumI (n+4), PSumI (n+5)" and the Q-phase preliminary total values "PSumQ (n+3), PSumQ (n+4), PSumQ (n+5)" are obtained.

Next, for each of the first and second pre-inspection periods, the preliminary total values of the unit periods are totalized by a totalization method while varying a combination of addition and subtraction, thereby calculating the power values. Specifically, the preliminary total values of the unit periods constituting each pre-inspection period are totalized by four combinations {(positive, positive, positive), (positive, negative, positive), (positive, positive, negative), (positive, negative, negative)}, and the power values "Power1 to Power4" are calculated using the totalization results.

Thereafter, the power values "Power1 to Power4" are compared in magnitude with each other. The preliminary total values of the unit periods are totalized in accordance with a combination of addition and subtraction (totalization method) corresponding to the maximum power value. For example, if "Power3" from among the power values "Power1 to Power4" is maximum, a corresponding combination (totalization method) of addition and subtraction is {(positive, positive, negative)}. For this reason, the preliminary total values of the three unit periods are totalized in a state where the preliminary total value of the first unit period is "positive", the preliminary total value of the second unit period is "positive", and the preliminary total value of the third unit period is "negative".

For each of the first and second pre-inspection periods, the above processing is performed, such that for the first pre-inspection period, a first IQ total value vector "IQ (n, n+1, n+2)" with an I-phase total value "SumI (n, n+1, n+2)" and a Q-phase total value "SumQ (n, n+1, n+2)" as components is obtained. For the second pre-inspection period, a second IQ total value vector "IQ (n+3, n+4, n+5)" having an I-phase total value "SumI (n+3, n+4, n+5)" and a Q-phase total value "SumQ(n+3, n+4, n+5)" as components is obtained.

Next, inner product calculation of the first IQ total value vector "IQ (n, n+1, n+2)" and the second IQ total value vector "IQ (n+3, n+4, n+5)" is performed to obtain an IQ inner product value "Dot (n+2|n+3)". If the IQ inner product value "Dot (n+2|n+3)" is negative, it is determined that there is a bit change at the boundary between the (n+2)th unit period and the (n+3)th unit period. If the IQ inner product value "Dot (n+2|n+3)" is positive, it is determined that there is no bit change at the boundary.

5-3. Change of Pre-Inspection Time based on Reception Situation

At least one of the first and second pre-inspection times (at least one of N and M) may be changed on the basis of the reception situation of a GPS satellite signal. For example, the pre-inspection time may be changed for each GPS satellite with information regarding the signal intensity of the reception signal of the GPS satellite signal or the reception environment of the GPS satellite signal as the reception situation of the GPS satellite signal. The first and second pre-inspection times may be both changed or only one of the first and second pre-inspection times may be changed.

For example, when the signal intensity of the reception signal is strong, it is possible to obtain a reliable correlation value by the correlation operation compared to a case where the signal intensity is weak. For this reason, if bit change determination is performed using the IQ inner product value, there is an increasing possibility that the presence/absence of a bit change is correctly determined. Thus, when the signal intensity of the reception signal is strong, the pre-inspection time may be shortened compared to a case where the signal intensity is weak. Similarly, if the reception environment of the GPS satellite is satisfactory, it is possible to acquire a reliable correlation value by the correlation operation compared to a case where the reception environment is not satisfactory. For this reason, when the reception environment is satisfactory, the pre-inspection time may be shortened compared to a case where the signal intensity is weak.

Figure 11:
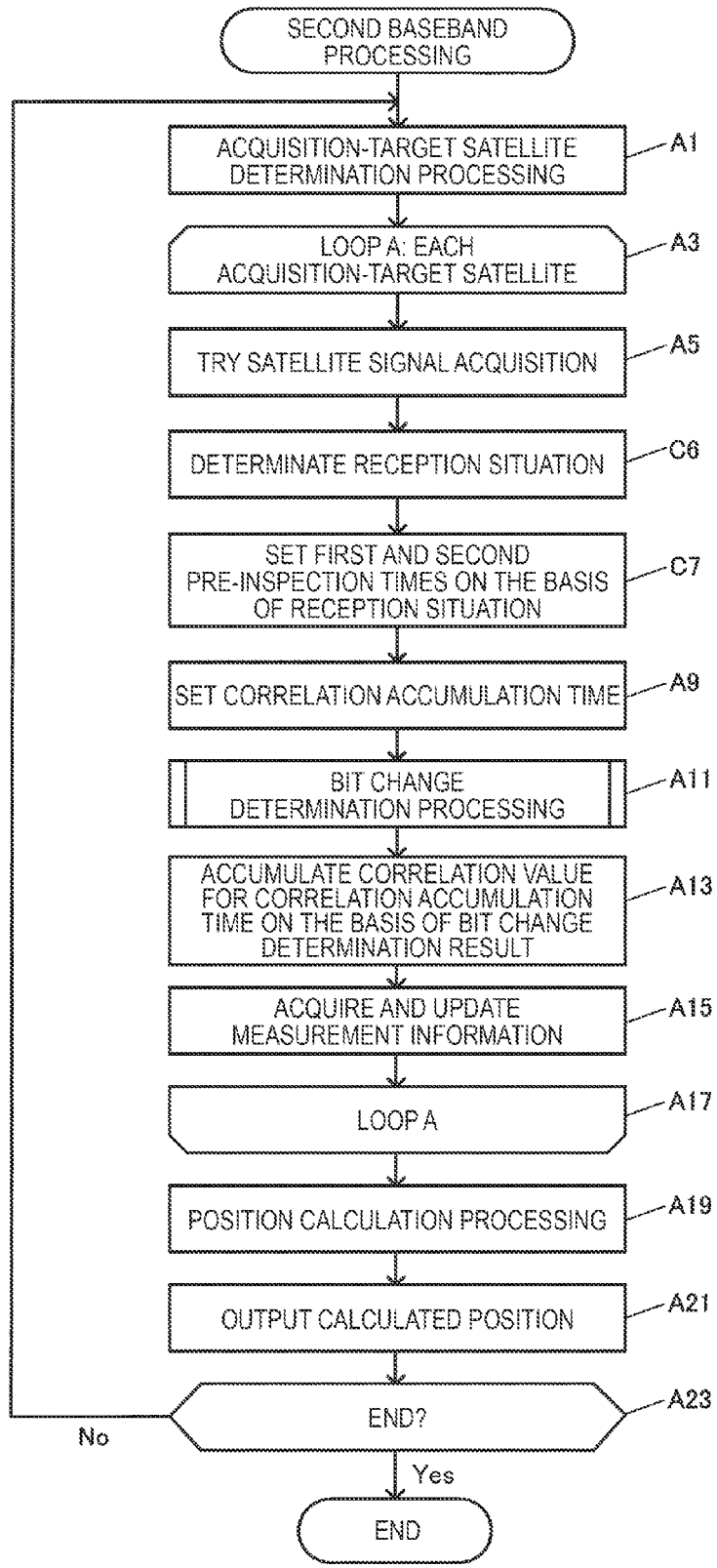
FIG. 11 is a flowchart showing the flow of second baseband processing.

FIG. 11 is a flowchart showing the flow of a second baseband processing which is performed in the satellite signal acquisition unit 251 in this case, instead of the baseband processing of FIG. 6. The same steps as the baseband processing are represented by the same reference numerals, and description thereof will be omitted. Description will be provided focusing on steps different from the baseband processing.

After trying to acquire the satellite signal in Step A5, the satellite signal acquisition unit 251 determines the reception situation of the GPS satellite signal (Step C6). For example, a C/N ratio (Carrier to Noise ratio) is calculated to measure the signal intensity of the reception signal, or the reception environment of the GPS satellite signal is determined on the basis of information regarding the sky arrangement of the GPS satellite or the elevation angle of the GPS satellite. The satellite signal acquisition unit 251 sets the first and second pre-inspection times on the basis of the determined reception situation (Step C7).

FIG. 12 is a diagram showing an example of the table configuration of a first setting table which is an example of a pre-inspection time setting table. The first setting table is a table for setting the pre-inspection time on the basis of the signal intensity of the reception signal, and stores the signal intensity, the first pre-inspection time, and the second pre-inspection time in association with each other. As the signal intensity is strong, a short time is set as the first and second pre-inspection times. In this table, the time is determined such that the second pre-inspection time is longer than the first pre-inspection time with respect to the same signal intensity. When the signal intensity is measured in Step C6, the satellite signal acquisition unit 251 references the first setting table and sets the first and second pre-inspection times corresponding to the measured signal intensity.

FIG. 13 is a diagram showing an example of the table configuration of a second setting table which is an example of a pre-inspection time setting table. The second setting table is a table for setting the pre-inspection time on the basis of the reception environment of the GPS satellite signal, and stores the reception environment, the first pre-inspection time, and the second pre-inspection time in association with each other. As the reception environment is satisfactory, a short time is set as the first and second pre-inspection times. In this table, the time is determined such that the first pre-inspection time and the second pre-inspection time are the same with respect to the same reception environment. When the reception environment is determined in Step C6, the satellite signal acquisition unit 251 references the second setting table and sets the first and second pre-inspection times on the basis of the determined reception environment.

Figure 14:
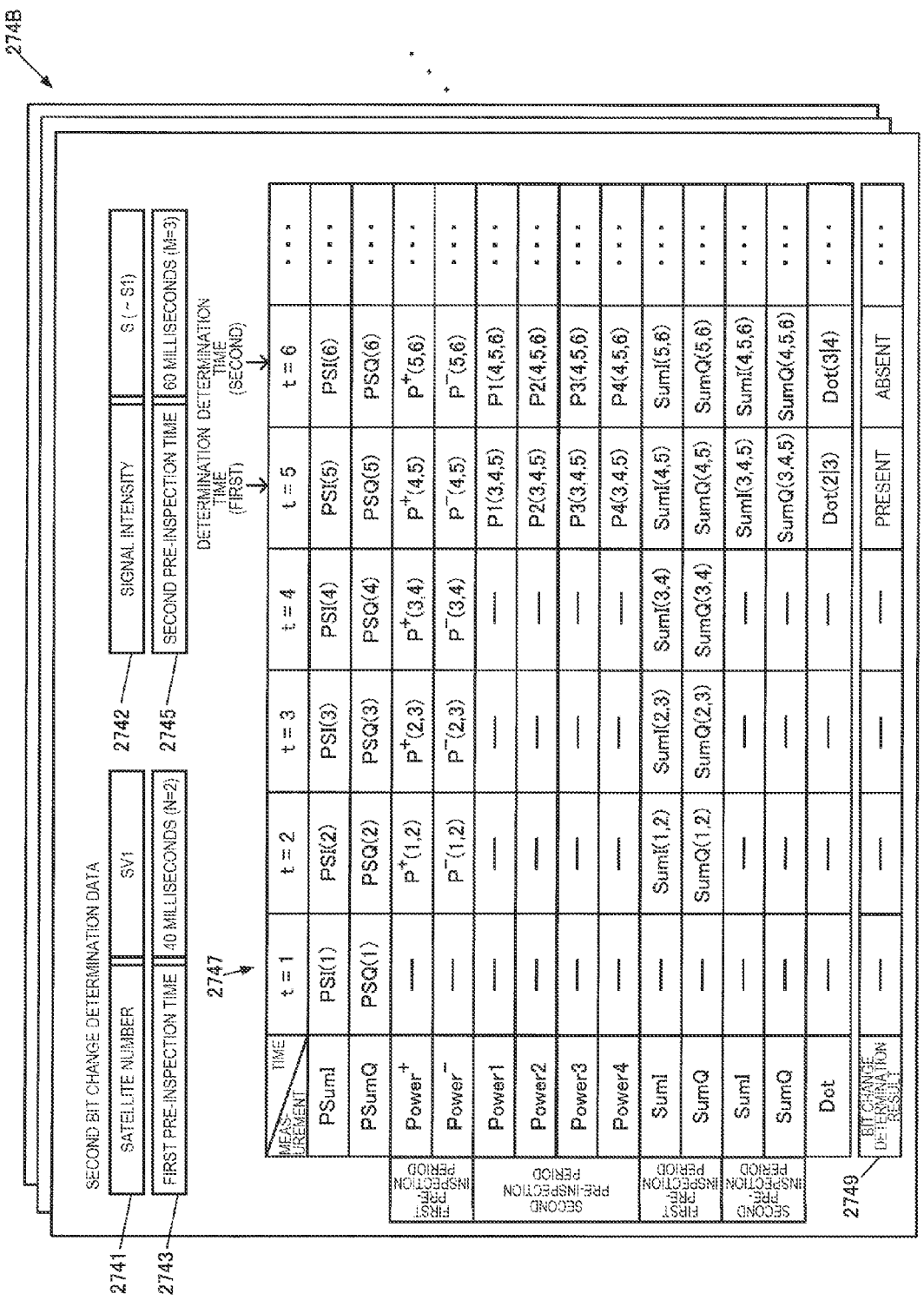
FIG. 14 is a diagram showing an example of the data configuration of second satellite-specific bit change determination data.

FIG. 14 is a diagram showing an example of the data configuration of second satellite-specific bit change determination data 274B which is used by the satellite signal acquisition unit 251 as bit change determination data. The same data elements as satellite-specific bit change determination data 274 shown in FIG. 5 are represented by the same reference numerals, and description thereof will be omitted.

Second bit change determination data 274B stores the signal intensity 2742 of the reception signal, in addition to the satellite number 2741, the first pre-inspection time 2743, and the second pre-inspection time 2745. Specifically, data on the nearest side of FIG. 14 is data for an acquisition-target satellite having the satellite number 2741 of "SV1", and the signal intensity 2742 of the reception signal is "S". As the pre-inspection time corresponding to the signal intensity 2742, the first pre-inspection time is set to "40 milliseconds (N=2)", and the second pre-inspection time is set to "60 milliseconds (M=3)".

Since the preliminary total values "PSumI, PSumQ" are calculated for each (20 milliseconds), the preliminary total values "PSumI, PSumQ" are stored for each of the times "t1, t2, t3, t4, t5, t6, . . . ". The power values "Power$^+$, Power$^-$" of the first pre-inspection period are initially calculated when the first pre-inspection time (40 milliseconds) has elapsed, and are subsequently calculated each time the unit time elapses. For this reason, no data is stored at the time "t1", and data is stored at each time since the time "t2".

The power values "Power$^+$, Power$^-$" of the second pre-inspection period are initially calculated when the inspection time (100 milliseconds) which is the sum of the first and second pre-inspection times has elapsed, and are subsequently calculated each time the unit time elapses. For this reason, no data is stored at the times "t1 to t4", and data is stored at each time since the time "t5".

Since the total values "PSumI, PSumQ" are calculated on the basis of the result of the preliminary determination of a bit change, the total values are calculated in time with the calculation timing of the power values. Since the power values of the first pre-inspection period are initially calculated at the time "t2", data of the total values is stored at each time since the time "t2". Since the power values of the second pre-inspection period are initially calculated at the time "t5", data of the total values is stored at each time since the time "t5".

The first determination is performed at the time "t5". In this case, the IQ inner product value "Dot (2|3)" is calculated using data "SumI (1, 2), SumQ (1, 2)" of the total values at the time "t2" and data "SumI (3, 4, 5), SumQ (3, 4, 5)" of the total values at the time "t5". The presence/absence of a bit change at the time "t2" is determined on the basis of the IQ inner product value "Dot (2|3)".

5-4. Reduction in Processing Load

The calculation amount relating to the bit change determination may be reduced to reduce the processing load of the processing unit. In the above-described embodiment, a case has been described in which the preliminary determination of a change of the bit value is performed at each determination time. However, since the bit change determination is performed while shifting the time by the unit time, the presence/absence of a change in the bit value at the boundary between the first pre-inspection time and the second pre-inspection time is determined each time the unit time elapses. Therefore, with the use of the result of the previous main determination, it is not necessary to perform the preliminary determination.

For example, from the principle description of FIG. 1, in the first determination, the main determination is performed on the presence/absence of a bit change at the boundary between the (n+1)th unit period and the (n+2)th unit period, and the determination result is stored. Thereafter, in the second determination, for the first pre-inspection period, the presence/absence of a change in the bit value at the boundary between the (n+1)th unit period and the (n+2)th unit period is preliminarily determined. However, even when the preliminary determination is not performed, the presence/absence of a change of the bit value at the boundary between the (n+1)th unit period and the (n+2)th unit period is already known by the first main determination. For this reason, it should suffice that the preliminary determination is not performed in the second determination, and the total values are calculated using the result of the first main determination.

Similarly, in the third determination, the presence/absence of a change in the bit value at the boundary between the (n+2)th unit period and the (n+3)th unit period is preliminarily determined, but the presence/absence of a change in the bit value at the boundary is known through the second main determination. For this reason, it should suffice that the preliminary determination is not performed, and the total value is calculated using the result of the second main determination.

5-5. Electronic Apparatus

Although in the above-described example, for example, a case has been described where the invention is applied to a mobile phone which is a kind of an electronic apparatus, the electronic apparatus to which invention can be applied is not limited thereto. For example, the invention can also be applied to other electronic apparatuses, such as a car navigation system or a portable navigation system, a personal computer, a PDA (Personal Digital Assistant), and a wristwatch.

5-6. Main Unit of Processing

Although in the above-described embodiment, the acquisition of the satellite signal including the bit change determination is performed by the processing unit of the baseband processing circuit unit, the processing may be performed by the host processing unit of the electronic apparatus. The processing may be divided such that the acquisition of the satellite signal including the bit change determination is performed by the processing unit of the baseband processing circuit unit, and the position calculation is performed by the host processing unit of the electronic apparatus.

5-7. Satellite Positioning System

Although in the above-described embodiment, for example, GPS has been described as a satellite positioning system, other satellite positioning systems, such as WAAS (Wide Area Augmentation System), QZSS (Quasi Zenith Satellite System), GLONASS (GLObal NAvigation Satellite System), and GALILEO, may be used.

The entire disclosure of Japanese Patent Applications Nos. 2010-198610, filed on Sep. 6, 2010 and Nos. 2011-160713, filed on Jul. 22, 2011 are expressly incorporated by reference herein.

What is claimed is:

1. A bit change determination method comprising:
performing a correlation operation of a signal received from a satellite and a replica code;
segmenting the signal using a bit transition timing of navigation message data and performing a first calculation to calculate the result of the correlation operation for a first period having N (N≥1) continuous unit periods with a bit period of navigation message data as a unit period;
performing a second calculation to calculate the result of the correlation operation for a second period having M (M>1) continuous unit periods adjacent to the first period;
determining whether a bit value changes or not at a boundary between the first period and the second period using the first and the second calculation results; and
changing at least one of N and M on the basis of the reception situation of the satellite signal.

2. The bit change determination method according to claim 1, further comprising:
performing a first preliminary determination to determine whether the bit value of navigation message data changes or not in the first period using the result of the correlation operation; and performing a second preliminary determination to determine whether the bit value of navigation message data changes or not in the second period using the result of the correlation operation, wherein the determining whether the bit value changes or not at the boundary includes determining using the result of the first preliminary determination and the result of the second preliminary determination.

3. The bit change determination method according to claim 2, wherein the performing of the first calculation includes performing a plurality of calculations having combined therein addition and subtraction using the results of N correlation operations in the first period, the performing of the first preliminary determination includes determining whether the bit value of the navigation message data changes or not in the first period using a plurality of calculation results in the first calculation, the performing of the second calculation includes performing a plurality of calculations having combined therein addition and subtraction using the results of M correlation operations in the second period, and the performing of the second preliminary determination includes determining whether the bit value of navigation message data changes or not in the second period using a plurality of calculation results in the second calculation.

4. The bit change determination method according to claim 3, wherein the performing of the first preliminary determination includes calculating a plurality of methods using the results of the N correlation operations and calculating a plurality of power values, and determining whether the bit value of navigation message data changes or not in the first period on the basis of a calculation method in which the maximum power value is obtained, and the performing of the second preliminary determination includes calculating a plurality of methods using the results of the M correlation operations and calculating a plurality of power values, and determining whether the bit value of navigation message data changes or not in the second period on the basis of a calculation method in which the maximum power value is obtained.

5. The bit change determination method according to claim 1, wherein the determining whether the bit value changes or not at the boundary includes calculating an inner product of the first calculation result and the second calculation result to determine whether the bit value changes or not.

6. The bit change determination method according to claim 1, wherein the changing includes changing at least one of N and M to a smaller value when the reception situation is satisfactory than when the reception situation is not satisfactory.

7. A bit change determination device comprising:

a correlation operation unit which performs a correlation operation of a signal received from a satellite and a replica code;

a first calculation unit which segments the signal using a bit transition timing of navigation message data and performs a first calculation to calculate the result of the correlation operation for a first period having N (N≥1) continuous unit periods with a bit period of navigation message data as a unit period;

a second calculation unit which performs a second calculation to calculate the result of the correlation operation for a second period having M (M>1) continuous unit periods adjacent to the first period; and a determination unit which determines whether a bit value changes or not at a boundary between the first period and the second period using the first and second calculation results, wherein at least one of N and M is changed on the basis of the reception situation of the satellite signal.

* * * * *